United States Patent [19]

Okamoto

[11] Patent Number: 5,729,711
[45] Date of Patent: Mar. 17, 1998

[54] DATA DRIVEN INFORMATION PROCESSING SYSTEM USING ADDRESS TRANSLATION TABLE TO KEEP COHERENT CACHE AND MAIN MEMORIES AND PERMITTING PARALLEL READINGS AND WRITINGS

[75] Inventor: Toshiya Okamoto, Souraku-gun, Japan

[73] Assignee: Sharp Kabushiki Kaisha, Osaka, Japan

[21] Appl. No.: 251,372

[22] Filed: May 31, 1994

[30] Foreign Application Priority Data

Jun. 2, 1993 [JP] Japan .................................. 5-132201

[51] Int. Cl.$^6$ .............................................. G06F 12/10
[52] U.S. Cl. .................... 395/415; 395/416; 395/417; 395/467; 395/482; 395/496; 395/457; 395/446
[58] Field of Search ........................ 364/243.4, 243.41; 395/482, 446, 458, 467, 468, 471, 472, 496, 416, 417, 415, 457

[56] References Cited

U.S. PATENT DOCUMENTS

| | | | |
|---|---|---|---|
| 4,513,367 | 4/1985 | Chan et al. | 395/472 |
| 4,914,577 | 4/1990 | Stewart et al. | 395/417 |
| 5,097,409 | 3/1992 | Schwartz et al. | 395/472 |
| 5,148,536 | 9/1992 | Witek et al. | 395/467 |
| 5,155,843 | 10/1992 | Stamm et al. | 395/182.03 |
| 5,206,945 | 4/1993 | Nishimukai et al. | 395/403 |
| 5,230,070 | 7/1993 | Liu | 395/472 |
| 5,261,069 | 11/1993 | Wilkinson et al. | 395/472 |
| 5,353,425 | 10/1994 | Malamy et al. | 395/471 |
| 5,386,580 | 1/1995 | Yoshida et al. | 395/800 |
| 5,471,598 | 11/1995 | Quattromani et al. | 395/449 |
| 5,479,625 | 12/1995 | Nishimukai et al. | 395/403 |

FOREIGN PATENT DOCUMENTS

| | | |
|---|---|---|
| 4205041 | 7/1992 | Japan . |
| 4251350 | 9/1992 | Japan . |
| 4340678 | 11/1992 | Japan . |

OTHER PUBLICATIONS

Alan J. Smith, "Cache Memories", Computing Surveys, vol. 14, No. 3, Sep. 1982, pp. 473–530.

Peter M Kogge, "The Architecture of Pipelined Computers", Hemisphere Publishing Corp., 1981, pp. 71–95 & 212–287.

"An Evaluation of Parallel-Processing in the Dynamic Data-Driven Processors", Kanekura et al., Information Processing Society of Japan,, IPSJ, pp. 9–18, Nov. 1991.

Primary Examiner—Eddie P. Chan
Assistant Examiner—Hong C. Kim

[57] ABSTRACT

The system includes a data driven processor, a main memory, a cache memory and a memory access unit for accessing the cache memory, the main memory or both and for maintaining the contents of the cache memory in coherence with the contents of the main memory. Read/write from and to the memory can be carried out accurately at high speed without increasing the circuit scale. The memory access unit stores, in response to a write instruction, the data also in the cache memory. Even in a specific processing in which one data is read only once, the data can be read from the cache memory unit. Preferably, the memory access unit stores information specifying an access mode of the most recent access to the cache memory address by address, and compares the most recent access mode and the mode of the access to be taken. The memory access unit permits or inhibits access based on the result of comparison. A data item is not likely to be erroneously overwritten by the subsequent data before it is read. Preferably, the system includes main memories to which different addresses are allotted. The memory access unit accesses the cache memory by converting the address such that areas of different main memories are commonly assigned to one same area of the cache memory. For example, a part of the address is masked. Since a common area can be used both for reading and writing, the circuit scale can be reduced. A method for efficiently operating the system is also disclosed.

17 Claims, 25 Drawing Sheets

1

DATA DRIVEN INFORMATION PROCESSING SYSTEM USING ADDRESS TRANSLATION TABLE TO KEEP COHERENT CACHE AND MAIN MEMORIES AND PERMITTING PARALLEL READINGS AND WRITINGS

BACKGROUND OF THE INVENTION

1. Field of the Invention

The present invention relates to a data driven information processing system and, more specifically, to a data driven information processing system including a data driven processor and a memory interface unit in which the memory can be accessed with high efficiency.

2. Description of the Related Art

Kanekura et al. have proposed a multiprocessor system including a plurality of processors and a plurality of memory interfaces in an article "An Evaluation of Parallel-Processing in the Dynamic Data-Driven Processor" (Information Processing Society of Japan, IPSJ (pp. 9–18), November 1991). The data driven processor used in this system is suitable for signal processing in which a stream of data successively flows into the processor.

Referring to FIG. 1, an example of time necessary for certain processings which can be executed parallel to each other, will be described in the following. Referring to FIG. 1, if read and write of any arbitrary input data item of input data items 1 to 4 are not related to read and write of other input data items, these four processings can be effected parallel to each other. The overall processing time is w+p+r. The overall processing time does not increase even if the number of input data items increases. The processing time per one input data item is (w+p+r)/number of input data items. If the number of data items is sufficiently large, the processing time per one data item is negligible, even if the time necessary for processing each data item (response time) is relatively long. It goes without saying that the overall processing time is reduced if the response time is reduced.

However, in the above-described example, it is necessary that the processings taking place in parallel are sufficiently independent from each other. If the processings are mutually related, such parallel processing as shown in FIG. 1 cannot be effected since there is a possibility of a side effect. The side effect onto the data means an attempt of reading of data which has not yet been written in the memory, overwriting of data before reading, or the like. If processings are to be synchronized to avoid such side effect, the execution speed would be significantly decreased.

Referring to FIG. 2, if the processings are synchronized, the processing time is estimated as follows. If it is assumed that it is necessary that writing for each processing has been completed prior to the reading of a process subsequent to the same, these processings cannot be executed in parallel. As shown in FIG. 2, the overall processing time will be (w+p+r) x number of input data items. The larger the number of input data items, the longer the overall processing time. The response time has significant influence to the overall processing time. Namely, the longer the response time, the longer the overall processing time. The shorter the response time, the more reduced the overall processing time.

In the conventional data driven information processing system, response time for memory access by the processor is long. For this reason, there is a possibility of the side effect onto the data dependent on the timings of read and write of the memory. Sufficient time margin is necessary to avoid the side effect. For example, the data should be written only after reading is ensured. The time margin hinders increase of the speed of operation of the system.

In the conventional data driven information processing system, timing control of read/write is not carried out at all. Therefore, side effect onto the data in the memory is possible. A circuit for timing control may be provided in all the memories in the system in order to avoid the side effect. However, in that case, the circuit scale of the whole system would be enormous, making the system impractical.

In the conventional system, such a process is frequently executed that requires only one reading of each data item stored in the memory. In that case, the main memory must be accessed twice for write and read. Further, in the conventional system, the main memories must be accessed twice in such a process where an input is obtained from a read only memory and the result is written to another memory. If the response time to the main memory can be reduced, the overall processing time of such processings can be reduced. However, in the field of a system employing a data driven processor, a technique for reducing the memory access time in such processings has not been developed. Solution of such problem is essential to realize efficient operation of the data driven system. Further, in solving such problem, it is preferred to make small the circuit scale as much as possible in view of cost, speed of operation and system usability.

SUMMARY OF THE INVENTION

Therefore, an object of the present invention is to provide a data driven information processing system allowing accurate read/write from and to the memory at high speed without increasing the circuit scale.

Another object of the present invention is to provide a data driven information processing system particularly suitable for executing a specific processing, allowing accurate read/write from and to the memory at high speed without increasing the circuit scale.

A still another object of the present invention is to provide a data driven information processing system including a plurality of data driven processors, allowing accurate read/write from and to the memory at high speed without increasing the circuit scale.

A still further aspect of the present invention is to provide a data driven information processing system including a plurality of data driven processors, allowing precise read/write from and to the memory at high speed by the plurality of processors, without increasing the circuit scale.

A still further object of the present invention is to provide a data driven information processing system including a plurality of data driven processors and a plurality of main memories, allowing write to the main memory by a processor and read from the memory by another processor accurately at high speed without increasing the circuit scale.

The data driven information processing system of the present invention includes a data driven processor; a main memory for storing data to be processed by the data driven processor; a cache memory unit provided between the data driven processor and the main memory for storing at least a part of the contents of the main memory, which can be accessed faster than the main memory; and a memory access unit connected to the data driven processor, the cache memory device and the main memory, responsive to an issuance of an access instruction to the main memory by the data driven processor for accessing the cache memory unit, the main memory or both for inputting/outputting data between the data driven processor and the main memory or the cache memory unit and for maintaining the cache memory unit such that the contents in the cache memory unit are in coherence with the contents of the main memory.

In the cache memory unit, at least a part of the contents of the main memory is stored, and the contents are always maintained to be coherent with the contents of the main memory. Therefore, there will be much chances that the necessary data is obtained by accessing to the cache memory, which can be accessed at higher speed, rather than the main memory. This contribute to increase of the speed of operation. Since the cache memory requires smaller capacity than the main memory, the circuit scale need not be much enlarged. As a result, a data driven information processing system allowing accurate read/write from and to the memory at high speed without increasing the circuit scale can be obtained.

Preferably, the memory access unit includes a maintaining unit for maintaining correlation between contents stored in the cache memory unit and the contents stored in the main memory, and, responsive to an access instruction to the main memory by the data driven processor, for issuing an access instruction to the cache memory unit, an access instruction to the main memory, or both, at respective input/output units based on the correlation; and an input/output unit responsive to the access instruction to the main memory provided from the maintaining unit for carrying out input/output of data by accessing the main memory and for transferring data between the main memory and each of the data driven type processor and the maintaining unit.

The data is held in the cache memory not only when the access instruction to the main memory is a read instruction but also when it is a data write instruction. In a specific processing in which each data item is read only once, the data is held in the cache memory unit. Therefore, the system can execute such specific processing at higher speed.

More preferably, the maintaining unit includes a unit for storing, for every predetermined unit area of the cache memory, information specifying an access mode when it is most recently accessed; and a unit for comparing, when there is an access request to a certain unit area of the cache memory, the access mode when the unit area was most recently accessed and the mode of access to be made and for permitting or inhibiting the access based on the access request dependent on the result of comparison. For example, if the access mode when the unit area was most recently accessed is different from the mode of the access to be taken, the access based on the access request is permitted, while if the access mode is the same, the access is inhibited.

Therefore, there is not any possibility that the data written in the cache memory is erroneously overwritten by the next data before reading. This enables precise processing. There is less possibility of destruction of the contents in the cache memory when the main memory is shared by a plurality of processors.

More preferably, the system includes a plurality of main memories to which different addresses are allotted, and the maintaining unit includes an instruction determining unit operative in response to an access instruction applied from the data driven processor for determining whether the access instruction applied from the data driven processor is a write instruction or a read instruction to provide a determination result signal; a unit responsive to the determination result signal applied from the instruction determining unit and to a data packet from the data driven processor for selectively executing either writing to the main memory and to the cache memory, reading from the cache memory, or reading from the main memory and writing of the read data to the cache memory, in accordance with the address designation by the data packet; and an address converting unit responsive to the access request to the cache memory by the unit for selective execution, for converting the address designated by the data packet such that areas of different ones of the plurality of main memories are commonly assigned to one and the same area of the cache memory for executing the access to the cache memory. For this purpose, the address converting unit includes a unit for masking a part of the address designated by the data packet, for example.

When a processor reads data from a main memory, the data is also held in the cache memory. If the same processor accesses another main memory to write the data therein, the area of the cache memory unit holding that data can be used both for writing and reading. It is not necessary to separate the area for reading from the area for writing, and therefore the circuit scale can be further reduced.

The method of operating the data driven information processing system in accordance with another aspect of the present invention includes the following steps: starting a processing for applying a series of data necessary for carrying out a predetermined processing successively to the maintaining unit such that the data are successively stored in write addresses of a main memory designated in accordance with a predetermined order; a first step of requesting the maintaining device to read, after a predetermined first number of data items determined depending on the predetermined processing of the series of data have been stored in the main memory, a second number of data items not exceeding the first number determined dependent on the predetermined processing; a first step of requesting the maintaining unit to execute a predetermined operation on the read data applied from the maintaining unit and to rewrite the result of operation to a prescribed one of the addresses, from which the data have been read in the first step of requesting reading, of the main memory; a second step of requesting the maintaining unit to write a next data item of the series of data to a next write address designated by the predetermined order of the main memory; a second step of requesting the maintaining unit to read the second number of data items from a next read address designated by the predetermined order of the main memory; and executing the first and second steps of requesting writing and the second step of requesting reading repeatedly in parallel. Preferably, the second number is the first number, and more preferably, the predetermined order is an ascending order.

When the predetermined first number of data items determined dependent on the predetermined processing have stored in the main memory, the maintaining unit will have stored a copy of the data in the cache memory unit. When there is a request for reading the second number of data items, the data items are read from the cache memory unit without accessing to the main memory. When the result of operation on the read data is to be re-written in the main memory, the maintaining unit will be also holding a copy thereof in the cache memory unit. In parallel therewith, when a next data item of the series of data is to be written to a next write address of the main memory, the data is also held in the cache memory. When the second number of data items are to be further read from a next read address designated by the predetermined order of the main memory, copies of all the data items will be present in the cache memory unit. Therefore, it is not necessary to access the main memory for reading. As these steps are repeated and the series of data are further written to the cache memory, the copies of data in the main memory are consumed in the cache memory unit. However, before consumption of the data, processes using the data can be carried out. Since it is not necessary to access the main memory for reading, prescribed processings can be executed at high speed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, first to fourth embodiments of the present invention will be described in order. In each embodiment, a cache memory refers to a memory having smaller capacity than a memory (referred to as a main memory in the specification) accessed by the data driven processor, and which allows high speed accessing.

First Embodiment

Figure 3:
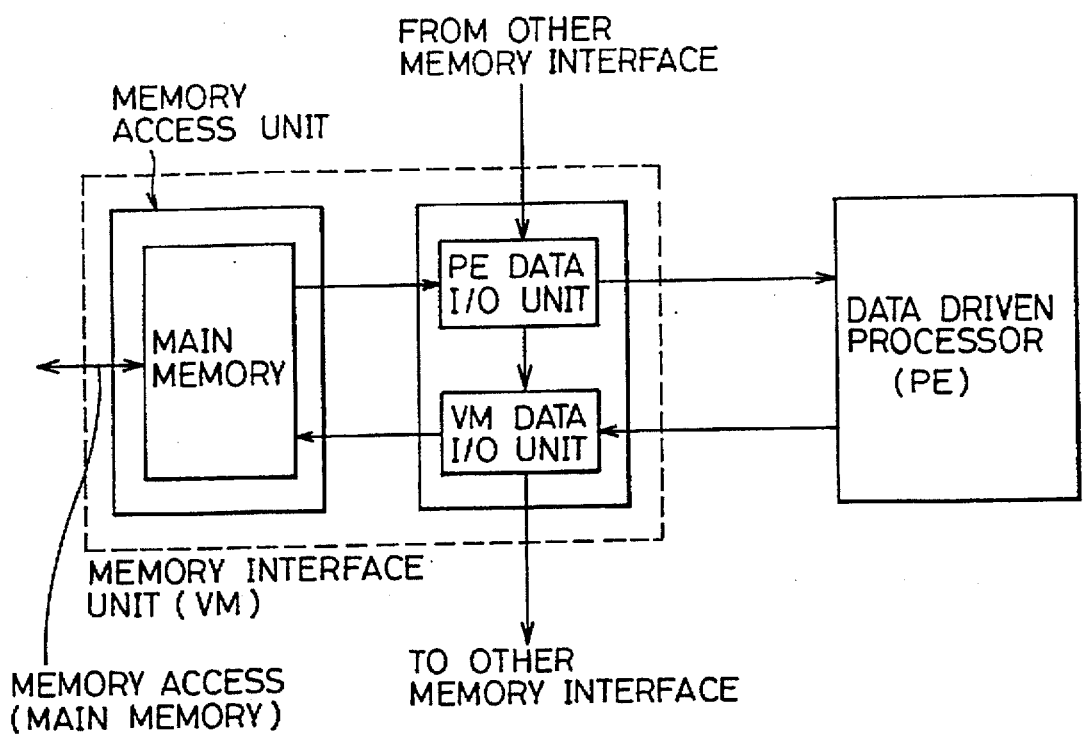
FIG. 3 schematically shows a relation between a conventional data driven processor and a memory interface unit.

Prior to the description of the first embodiment, the structure and operation of a conventional data driven system to be compared to the first embodiment will be briefly described. Referring to FIG. 3, a conventional data driven system includes a processor PE and a memory interface unit VM.

The memory interface unit VM includes a memory access unit including a main memory, and a data input/output unit connected between the main memory and the processor PE. The data input/output unit includes a data input/output unit for an access from the processor PE to the main memory, and a data input/output unit for providing data from the main memory to the processor PE. The data input/output unit is also connected to other memory interfaces.

Figure 4:
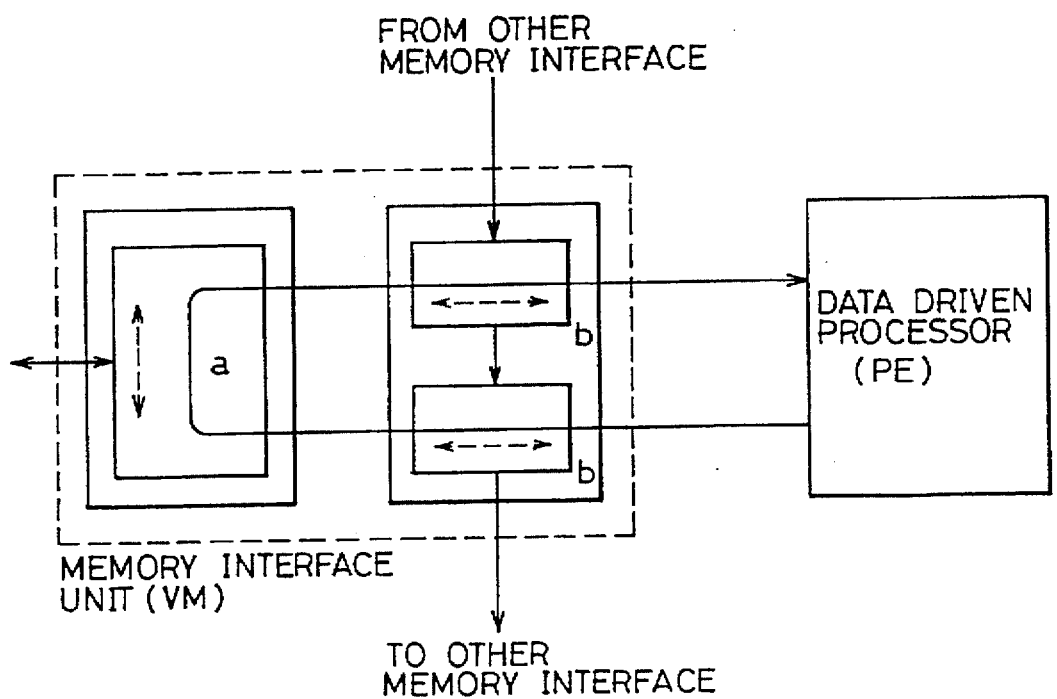
FIG. 4 shows a response time necessary for accessing in the example of FIG. 3.

Referring to FIG. 3, a time necessary for the data to pass through the input/output units (two units) is represented by e, and the time for the data to pass through the memory access unit is represented by a. As shown in FIG. 4, data write/read to and from the main memory always requires the time a+2b.

Figure 5:
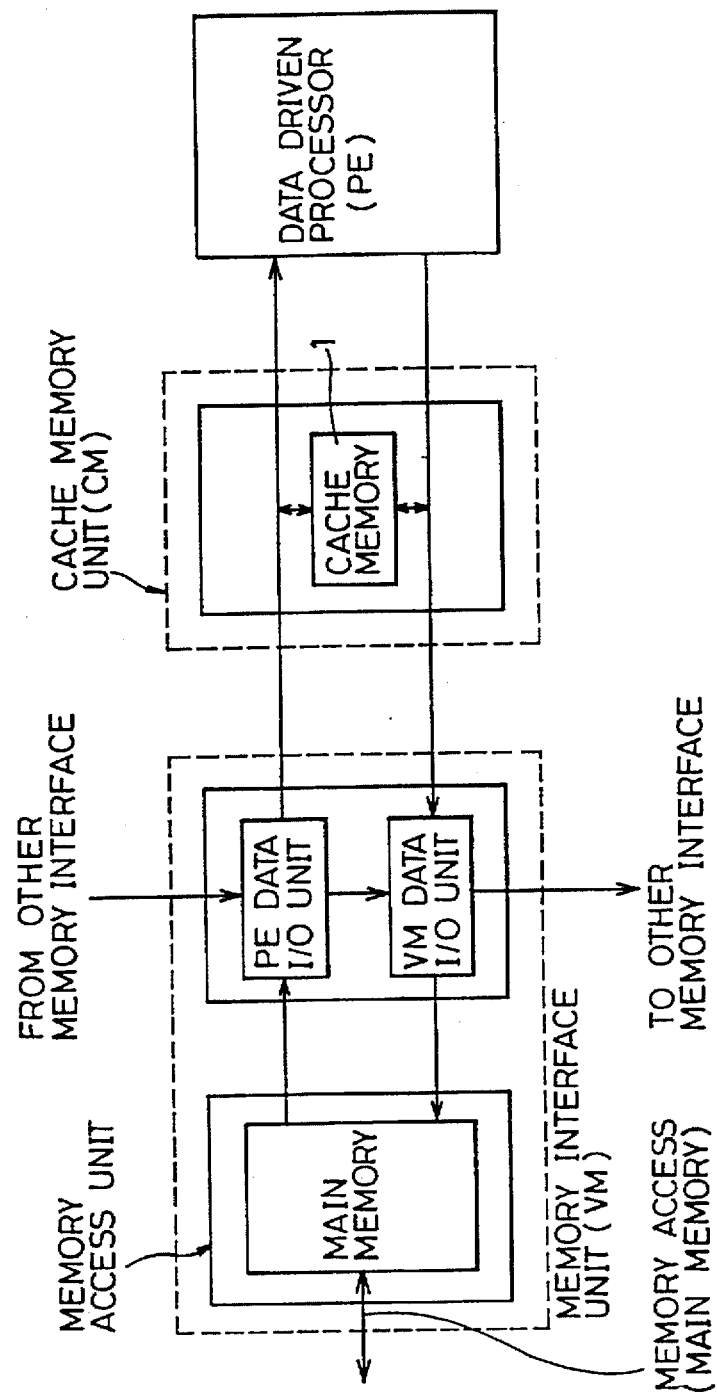
FIG. 5 is a block diagram of a data driven information processing system in accordance with a first embodiment of the present invention.

By contrast, the data driven processor in accordance with a first embodiment of the present invention, which will be described in the following, newly includes a cache memory unit CM having a cache memory 1, provided between the memory interface unit VM and the data driven processor PE, as shown in FIG. 5. The cache memory unit CM reduces the processing time related to the write/read of data to and from the main memory of data driven processor PE. The time necessary for write/read in accordance with the present embodiment will be roughly estimated.

Figure 6:
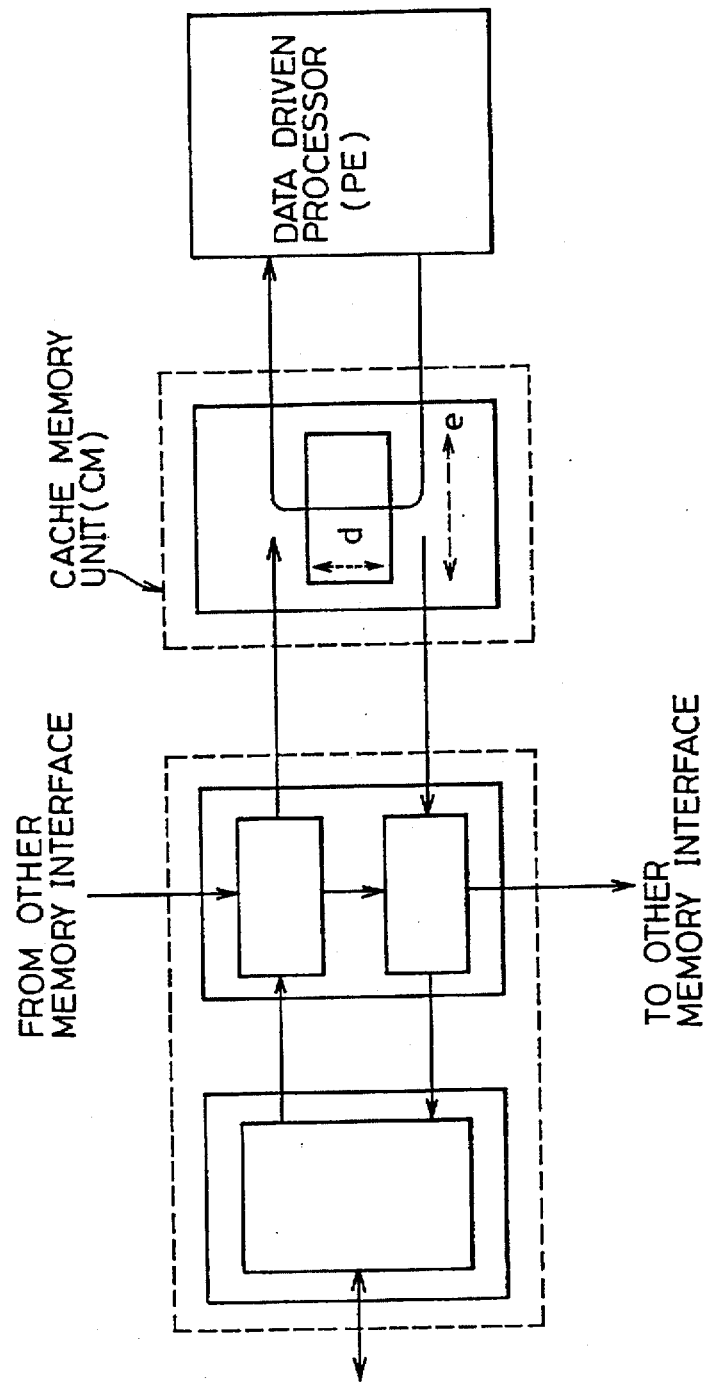
FIG. 6 shows a path for memory access in the best case (shortest time) in the system of FIG. 5.
Figure 7:
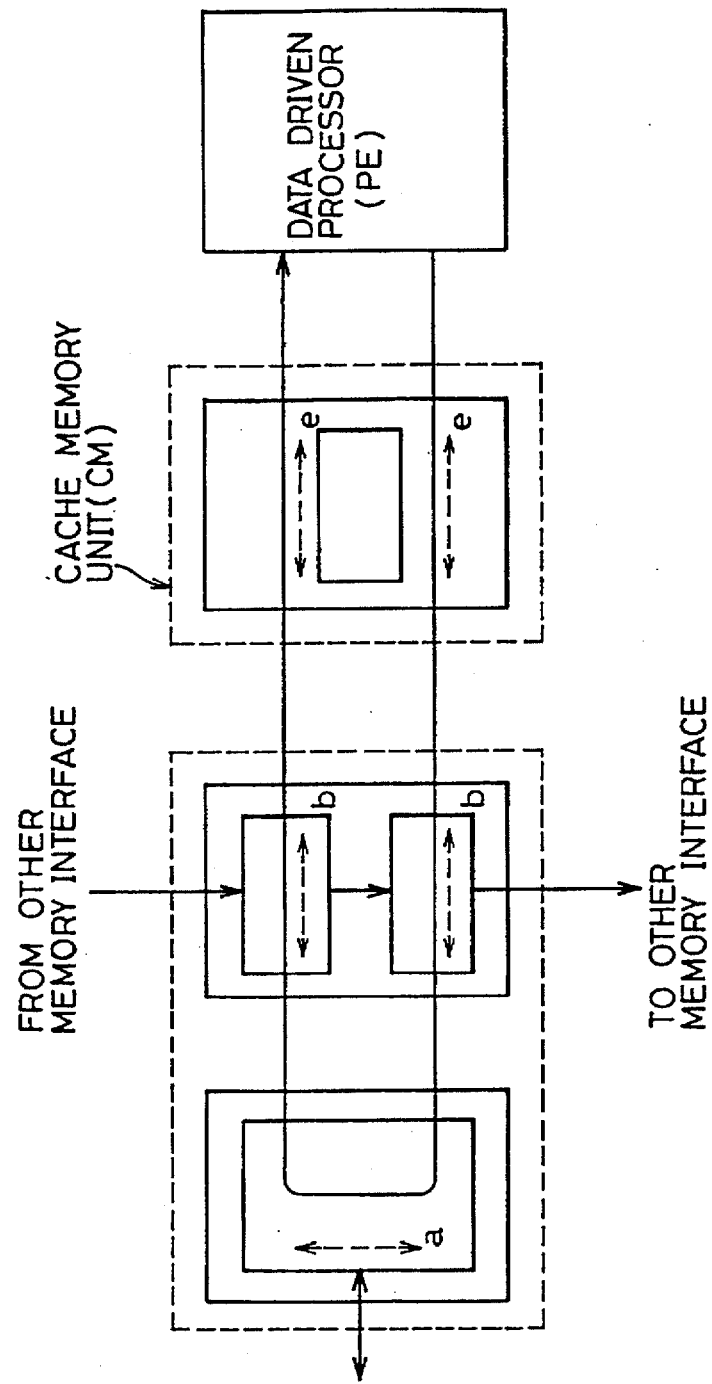
FIG. 7 shows a path for memory access in the worst case (longest time) in the system of FIG. 5.

The best case and worst case of the write/read of data between processor PE and memory interface unit VM through the cache memory unit VM are shown in FIGS. 6 and 7, respectively.

(1) Best Case (FIG. 6)

The best case refers to the case when data to be read is in the cache memory. When data is to be written to the main memory, the data is simultaneously written to the cache memory, as will be described in the following, allowing immediate reading. Therefore, data write is always falls into the best case. When the time necessary for input/output data by accessing the cache memory unit CM only is represented by d and the time necessary for the data to pass through the cache memory unit CM is represented by e, the time necessary in the best case is d. The times are denoted by characters d and e in FIG. 6.

(2) Worst Case (FIG. 7)

When the data to be read is not in the cache memory, it is necessary to access the main memory, which requires the longest time. Referring to FIG. 7, the necessary time is a+2b+2e. However, since the relation b>a>>d>e holds, the necessary time in the worst case is only slightly longer than the time necessary in the conventional example.

Even if it holds that a=b=d=e, the overall necessary time is approximately the same as the time necessary in the conventional system so long as the probability of cases (1) and (2) are 50%, respectively. If the probability of case (1) is higher than 50%, the overall necessary time will be shorter, and in that case, this embodiment is advantageous over the conventional system. Since b>a>>d>e holds, this embodiment is advantageous than the conventional system even if the probability of the case (1) is far smaller than 50%.

Figure 1:
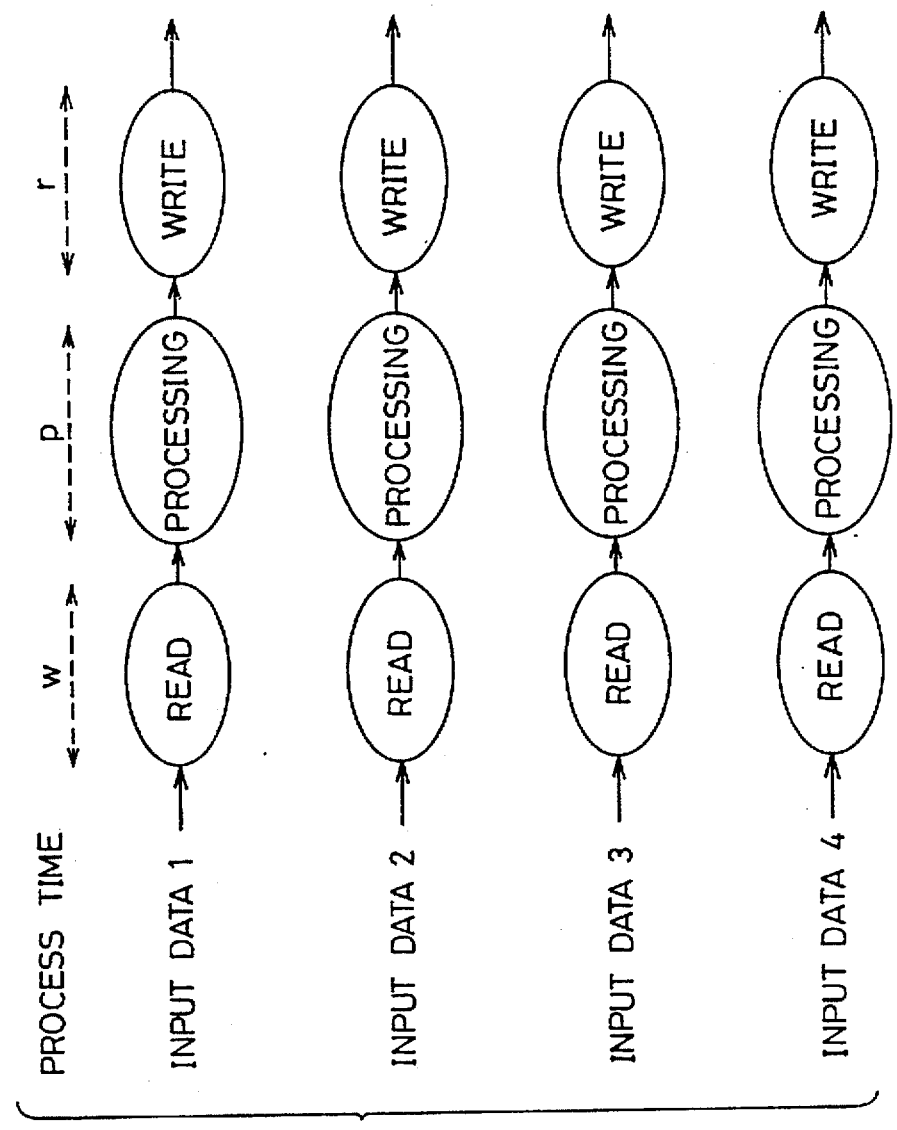
FIG. 1 schematically shows an example of processings which can be executed in parallel.
Figure 2:
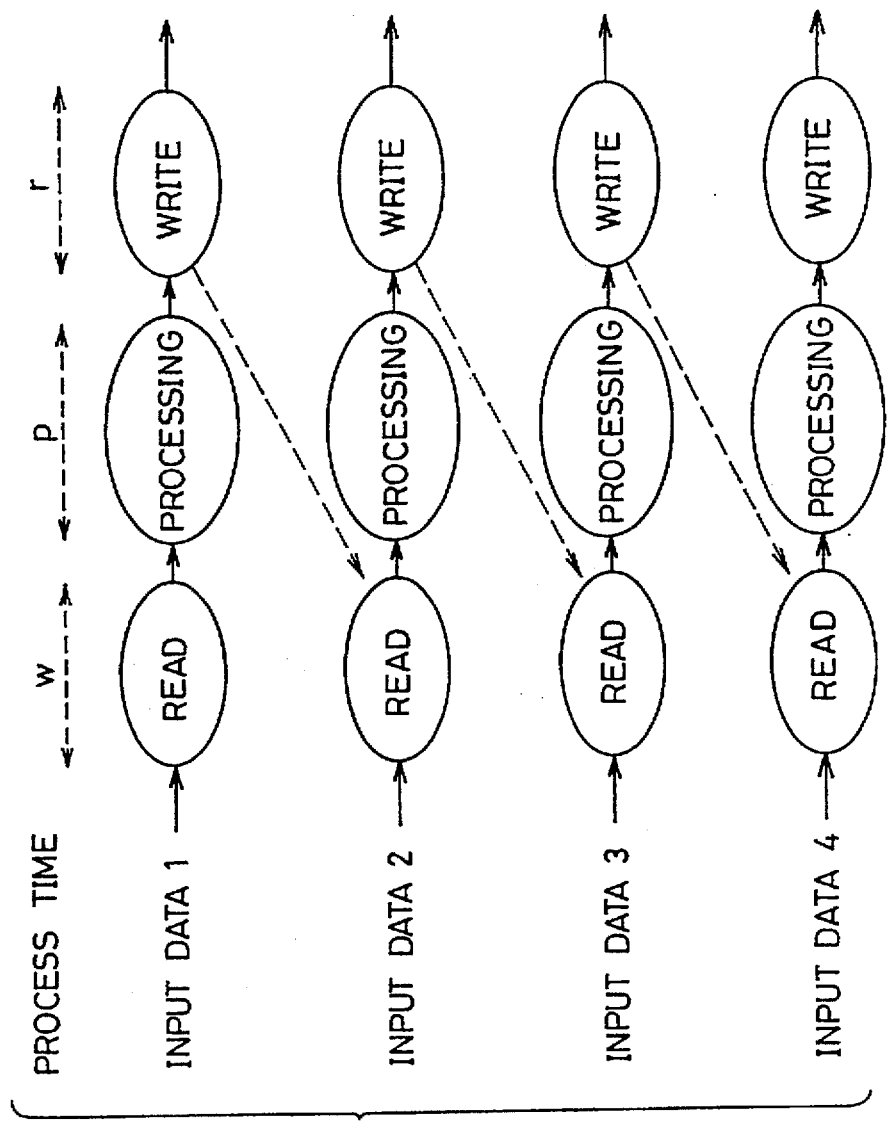
FIG. 2 schematically shows an example of processings synchronized with each other.

In the processing shown in FIG. 2, the probability of the case (1) is 100%. In that case, the system realizes reduction of response of at least one third as compared with the prior art, and system operates at the highest efficiency.

Figure 8:
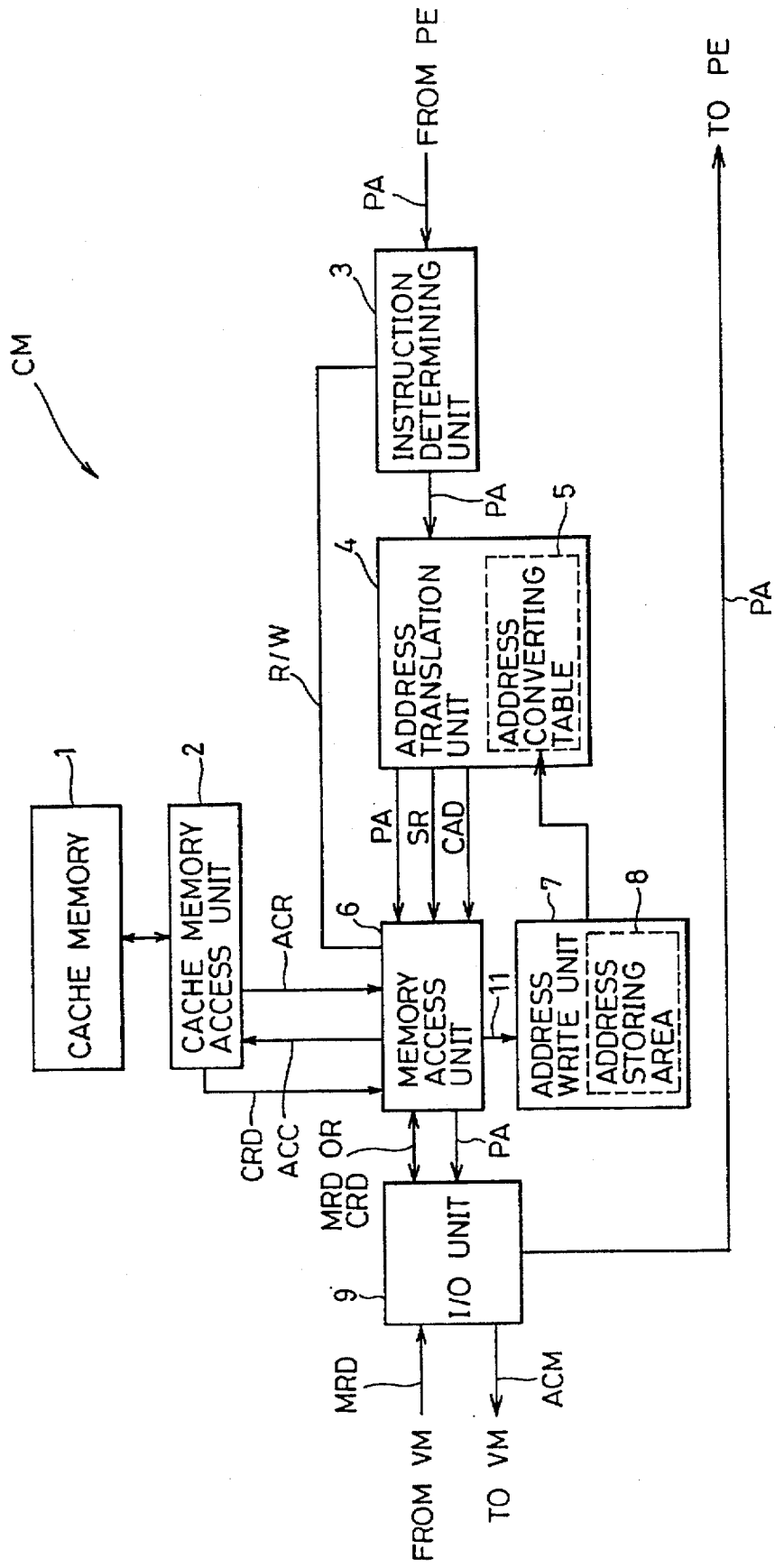
FIG. 8 is a block diagram of a cache memory unit in accordance with a first embodiment of the present invention.

Referring to FIG. 8, the cache memory unit CM includes a cache memory 1, a cache memory access unit 2 for accessing the cache memory 1, an instruction determining unit 3 for determining whether an instruction included in data packet PA applied from the processor is a write instruction or a read instruction and for providing a determination result signal, an address translation unit 4 including an address conversion table 5 for converting an address of the main memory included in the data packet PA to an address of the cache memory 1, a memory access unit 6 for controlling an access to the main memory or to the cache memory 1, an address write unit 7 having an address storing area 8 for updating/maintaining the address converting table 5, and an input/output unit 9 receiving the result of access to the main memory or to the cache memory 1 for providing the result to the processor PE.

Figure 9:
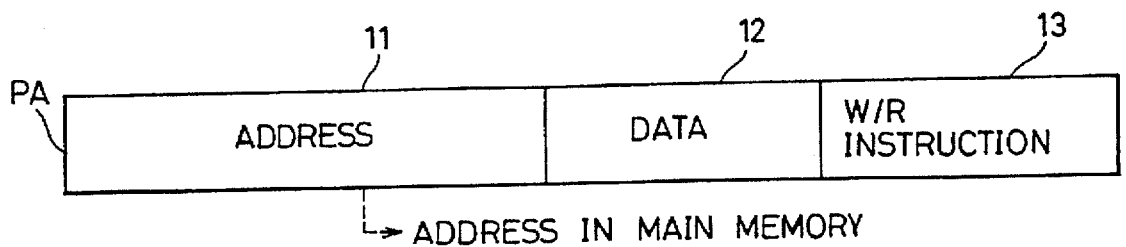
FIG. 9 shows a format of a data packet exchanged between the data driven processor and the cache memory unit in accordance with the first embodiment of the present invention.

Referring to FIG. 9, the data packet PA applied from the processor PE to the instruction determining unit 3 includes an address 11 for accessing the main memory, data 12 read from or to be written to the main memory, and an W/R instruction 13 for designating write operation (W) to the main memory or read operation (R) from the main memory.

Figure 10:
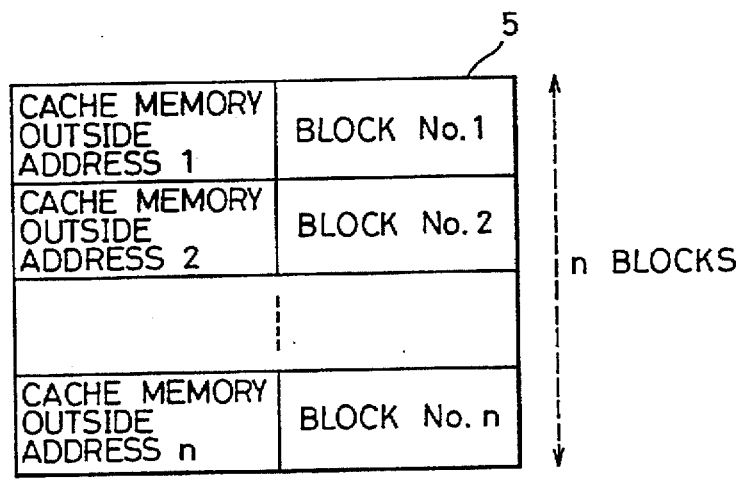
FIG. 10 shows a structure of the address conversion table of FIG. 8.
Figure 12:
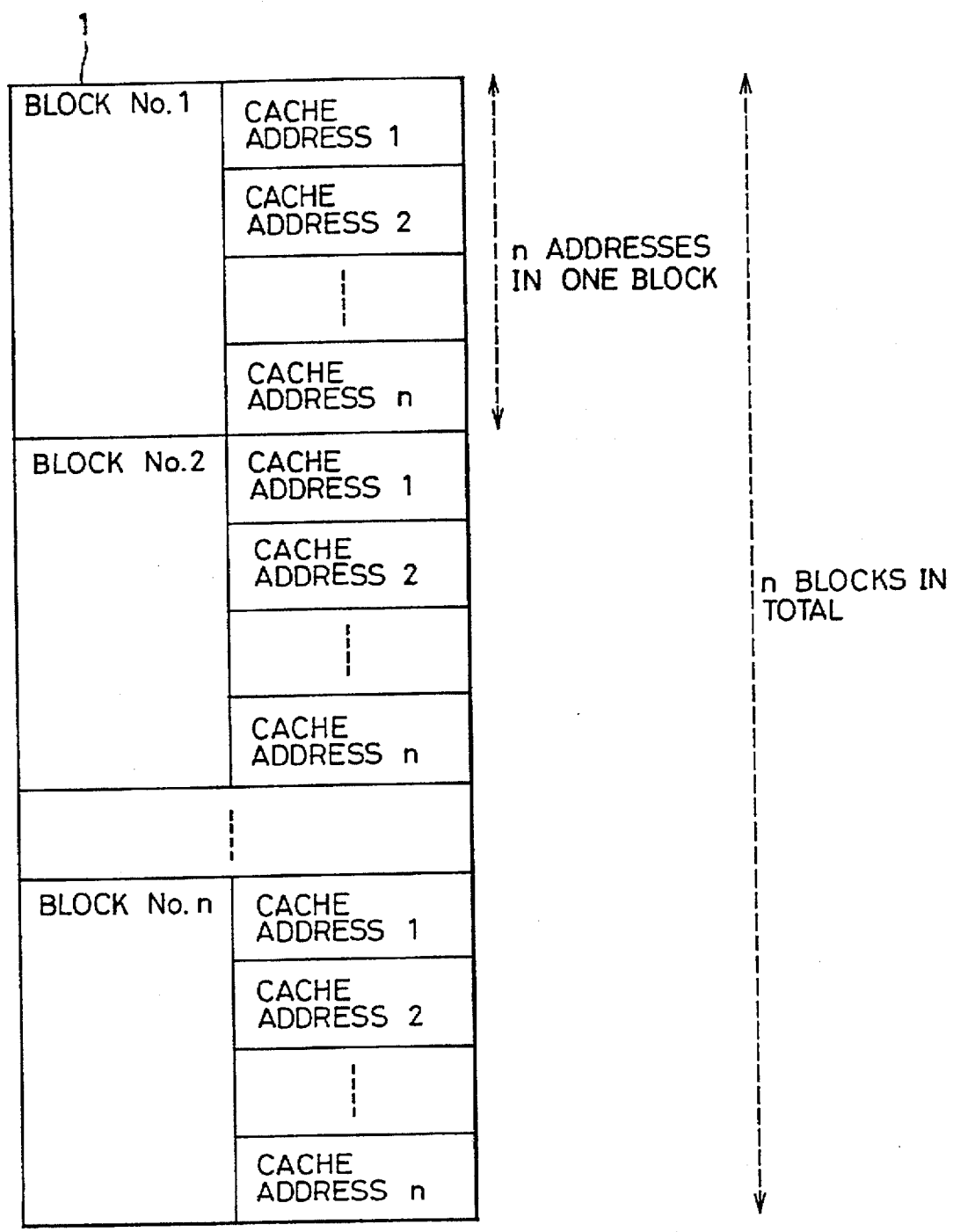
FIG. 12 shows a structure of the cache memory of FIG. 8.

Address converting table 5 stores in advance a plurality of sets of a cache memory outside address and a block number corresponding to the cache memory outside address, as shown in FIG. 10. In this embodiment, cache memory 1 is divided into n blocks each having n cache addresses as shown in FIG. 12. What is stored in table 5 are n cache memory outside addresses and n cache addresses for each of them.

Figure 11:
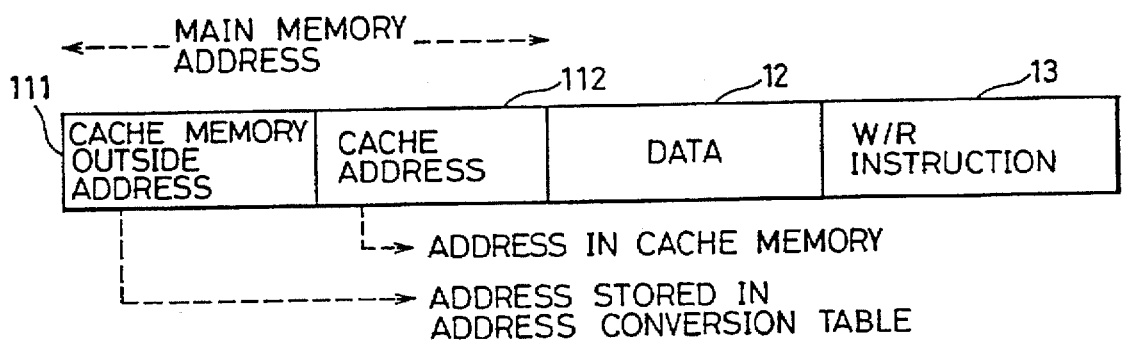
FIG. 11 shows a result of operation of the format shown in FIG. 9, in the address translating unit 4 of FIG. 8.

Referring to FIG. 11, the cache memory outside address refers to a prescribed number of uppermost bits of the address 11 in the data packet PA. The remaining part of the address 11 is referred to as the cache address. The cache memory outside address specifies the address of that block which is to be stored in the cache memory among a plurality of blocks in the main memory. For example, by appending zeroes of the cache address length to the cache memory outside address, a head address of the corresponding block can be designated. The address converting table 5 holds correlation between the position of storage in the cache memory and the cache memory outside address, when the block designated by the cache memory outside address is stored in the cache memory.

Referring to FIG. 11, a cache address 112 represents the relative position of the address from the head of the corresponding block. If the block is stored in the cache memory, cache address 112 represents the relative position of the address with respect to the block in the cache memory.

Figure 13:
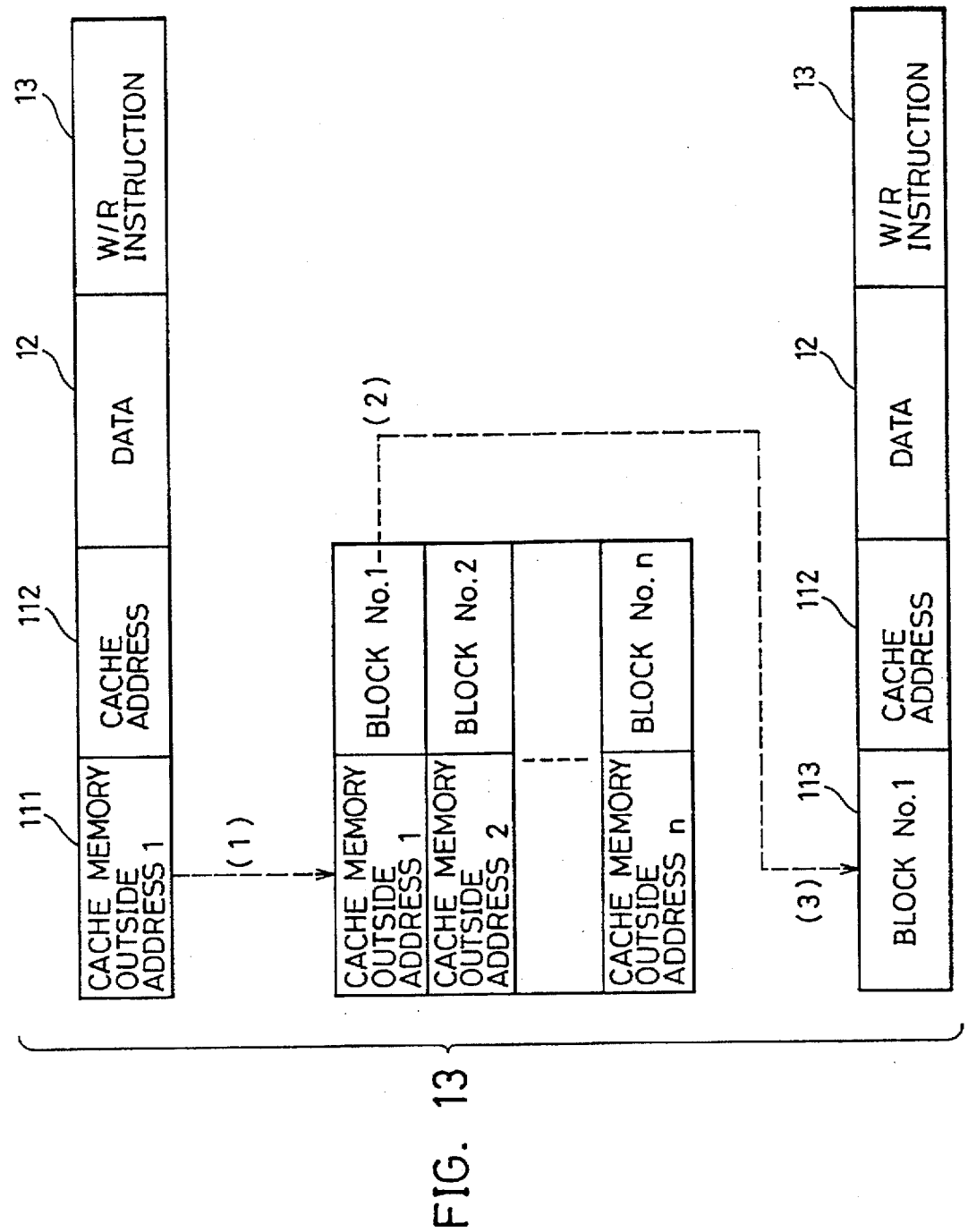
FIG. 13 illustrates an operation of the address converting portion of FIG. 8.

When a data packet PA of FIG. 9 is applied from the processor PE to the cache memory unit CM, the address translation unit 4 operates in the following manner. Based on the contents in address conversion table 5 of FIG. 10, address translation unit 4 translates the address 11 of the input packet PA and separates it to a cache memory outside address 111 and a cache address 112 as shown in FIG. 11. Referring to FIG. 13, first, address translation unit 4 searches the address conversion table 5 based on the obtained cache memory outside address 111 (see (1) of FIG. 13), reads the corresponding block number (see (2) of FIG. 13), and replaces the cache memory outside address 111 with the read block number 113.

The obtained block number 113 and the cache address 112 designates, when the copy of the block including the address designated by address 11 is stored in cache memory 1, the address of the block in cache memory 1.

The operation of the cache memory unit CM will be described with reference to FIGS. 8 and 14. When there is a main memory access request, the processor PE applies a data packet PA to the cache memory unit CM (see (5) of FIG. 14). The instruction determining unit 3 of cache memory unit CM determines whether the W/R instruction 13 of the data packet PA applied from the processor PE is a write instruction (W) or a read instruction (R), and applies the determination result signal R/W to memory access unit 6 (see FIG. 8). Instruction determining unit 3 also applies the input packet PA to address translation unit 4.

Referring to FIG. 8, address translation unit 4 translates the address 11 of the input packet PA in accordance with the contents of address conversion table 5, and separates the address 11 into a cache memory outside address and a cache address as shown in FIG. 11. Address translation unit 4 determines, by searching the table 5, whether there is the cache memory outside address in the address converting table 5. Dependent on whether there is the cache memory outside address or not, address translation unit 4 applies a table search result signal SR to memory access unit 6.

When there is the cache memory outside address in table 5 (see (2) of FIG. 13), address translation unit 4 reads the corresponding block number 113, replaces the cache memory outside address 111 with the block number 113, and applies the translation result signal CAD (including cache address 112 and block number 113) and the data packet PA to memory access unit 6. At this time, the search result signal SR assumes a value indicative of the existence of the corresponding block in the cache memory.

If there is not the cache memory outside address in the table 5, address translation unit 4 selects one block of cache memory 1 in accordance with a prescribed algorithm, for example the LRU (Least Recently Used) algorithm, replaces the cache memory outside address 111 with the block number 113, and applies the translation result signal CAD (including cache address 112 and block number 113) and the data packet PA to the memory access unit 6. At this time, the search result signal SR assumes a value indicative of the non-existence of the corresponding block in the cache memory.

Referring to FIG. 8, memory access unit 6 operates in the following manner based on the determination result signal R/W and the search result signal SR.

If the determination result signal R/W indicates a write instruction (W), memory access unit 6 applies the address 11 of data packet PA to an address write unit 7. Further, memory access unit 6 applies an access request signal ACC consisting of the translation result signal CAD and the data 12 of the data packet PA to the cache memory access unit 2.

Figure 14:
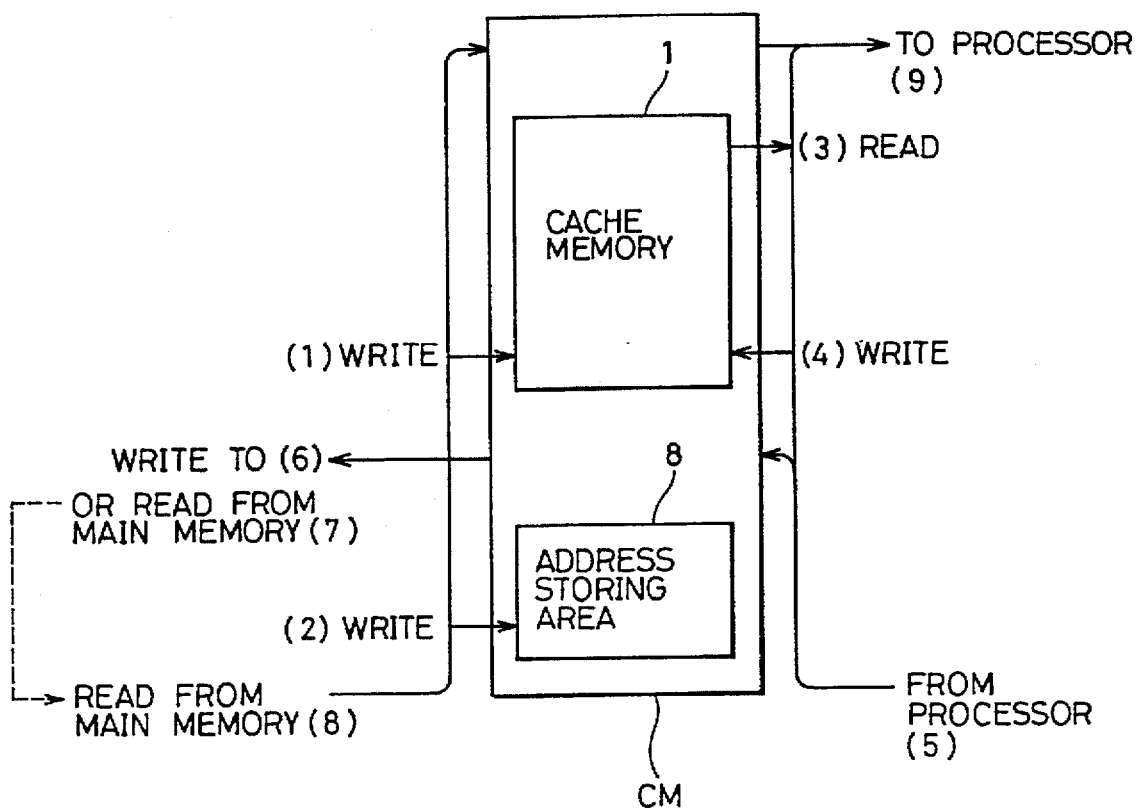
FIG. 14 schematically shows the operation of the cache memory unit of FIG. 8.

Address write unit 7 writes the applied address 11 and the block number of the translation result signal CAD to an address storing area 8 (see (2) of FIG. 14). In accordance with the address designation based on the applied translation result signal CAD, cache memory access unit 2 writes data 12 in cache memory 1 (see (4) of FIG. 14), and provides an access result signal ACR to memory access unit 6. Memory access unit 6 applies the data packet PA to input/output unit 9. In response, input/output unit 9 applies the access request signal ACM (including address 11 and data 12 of data packet PA) to memory interface unit VM. Though not shown, memory interface unit VM writes data 12 in the main memory in accordance with the address designation based on the address 11 applied from input/output unit 9 (see (6) of FIG. 14).

If the search result signal SR indicates that the block including the address does not exist in cache memory 1, address write unit 7 combines the block number to which writing is effected in cache memory 1 and the cache memory outside address, stored in address storing area 8, and writes the combined set to table 5.

The data writing operation to the main memory is thus completed.

If the determination result signal R/W indicates a read instruction (R) and the search result signal SR indicates that the block of the main memory designated by the cache memory outside address is in the cache memory 1, memory access unit 6 operates in the following manner. Memory access unit 6 applies an access request signal ACC including the translation result signal CAD to the cache memory access unit 2. In accordance with address designation based on the translation result signal CAD, cache memory access unit 2 reads data from cache memory 1 (see (3) of FIG. 14). The data CRD read from the cache memory 1 is applied together with the access resulting signal ACR to memory access unit 6.

Memory access unit 6 applies the data CRD read from the cache memory 1 to input/output unit 9. Input/output unit 9 applies a data packet PA storing the read data CRD as data 12 to the processor PE (see (9) of FIG. 14).

When the determination result signal R/W indicates a read instruction (R) and the search result signal SR indicates that the block of the main memory designated by the cache memory outside address is not in the cache memory 1, memory access unit 6 operates in the following manner. Memory access unit 6 applies a data packet PA to input/output unit 9 and applies an address 11 of data packet PA and a block number in the translation result signal CAD to address write unit 7.

Input/output unit 9 applies an access request signal ACM (including address 11 of data packet PA) to the memory interface unit VM (see (7) of FIG. 14).

Though not shown, memory interface unit VM reads data from the main memory in accordance with the address designation based on the address 11 applied from input/output unit 9 and applies the read data MRD to input/output unit 9 (see (8) of FIG. 14).

Input/output unit 9 applies the read data MRD to memory access unit 6. Meanwhile, address write unit 7 writes the cache memory outside address of the applied address 11 and the block number of translation result signal CAD to address storing area 8 (see (2) of FIG. 14).

Memory access unit 6 applies an access request signal ACC including the applied data MRD and the translation result signal CAD applied from address translation unit 4 to the cache memory access unit 2. Cache memory access unit 2 writes the read data MRD to cache memory 1 in accordance with address designation based on the applied translation result signal CAD (see (1) of FIG. 14). Input/output unit 9 provides a data packet PA storing the read data MRD as data 12 to processor PE (see (9) of FIG. 14).

Address write unit 7 combines the block number to which writing is effected in cache memory 1 and the cache memory outside address, stored in address storing area 8, and writes the combined set to table 5.

Thus data read operation with respect to the main memory is completed.

As described above, when there is a data write request of the main memory from the processor PE, data is written to the main memory and the cache memory 1 simultaneously. When there is a data read request, the main memory is not directly accessed but at first, it is determined whether there is a copy of the data in cache memory 1. If there is a copy of the data in cache memory 1, only the cache memory is accessed and the corresponding data is read from the cache memory 1. Since the cache memory can be accessed at higher speed than the main memory, the memory access response time can be significantly reduced.

Second Embodiment

Figure 15:
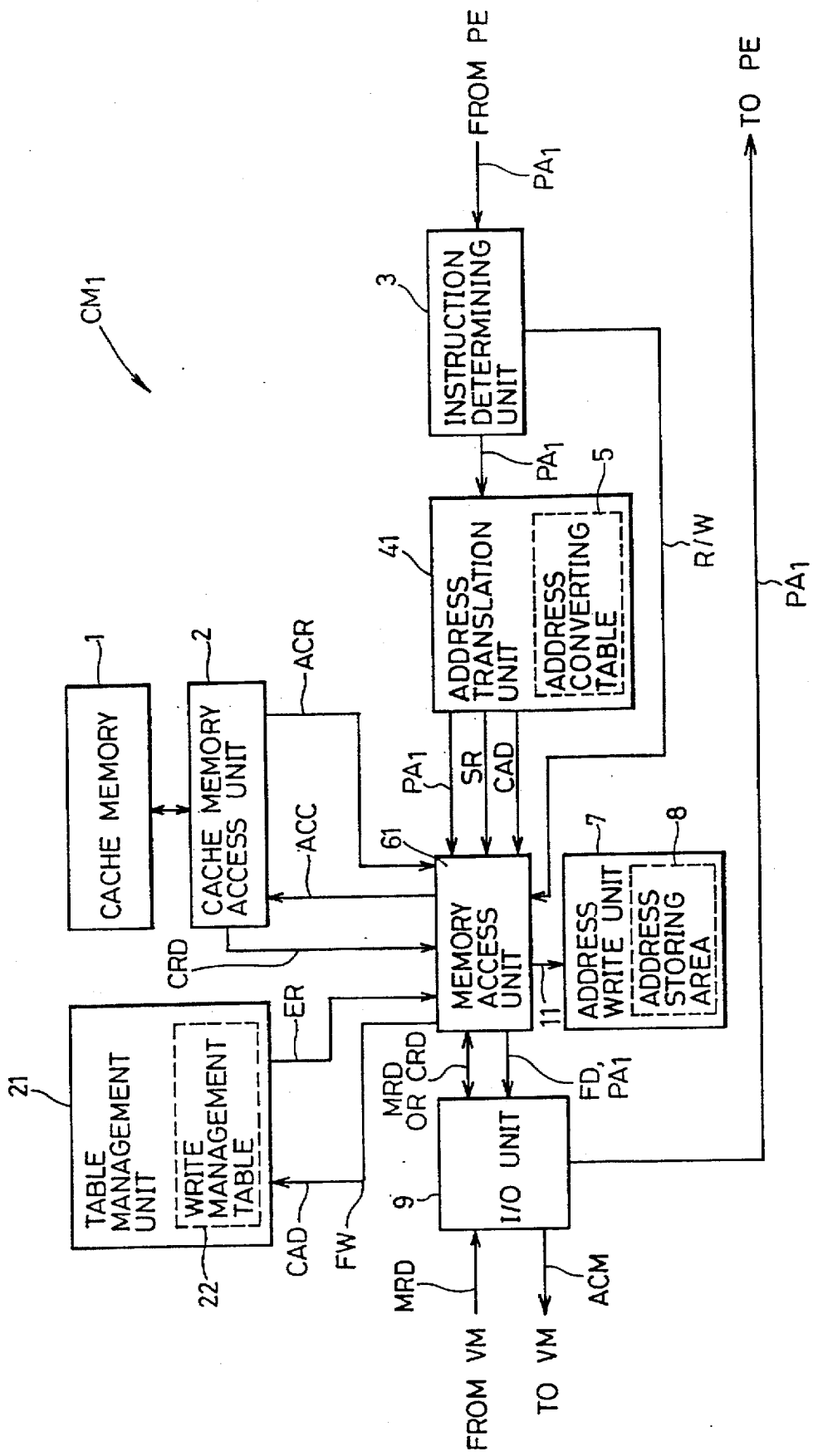
FIG. 15 is a block diagram of a cache memory unit in accordance with a second embodiment of the present invention.

In the second embodiment, referring to FIG. 15, the timing control related to read/write from and to the main memory of the processor PE in the cache memory unit CM1 is effected on the cache memory 1 which has smaller scale than the main memory. By doing so, in this embodiment a small scale timing control circuit is implemented while the side effects on the data can be prevented. Meanwhile, the data driven information processing system in accordance with the second embodiment differs from that of the first embodiment in that the system of the second embodiment includes a cache memory unit CM1 in place of the cache memory unit CM of the first embodiment. Other structures of the system in accordance with the second embodiment are the same as those of the first embodiment, and therefore detailed description thereof is not repeated here.

Referring to FIG. 15, the cache memory unit CM1 of the system in accordance with the second embodiment of the present invention includes a cache memory 1, a cache memory access unit 2 for accessing the cache memory 1, an instruction determining unit 3, an address translation unit 41 including an address conversion table 5, a memory access unit 61 controlling access to the main memory or the cache memory 1, an address write unit 7 including an address storing area 8, an input/output unit for providing the result of access to the main memory or the cache memory 1 to the processor PE, and a table management unit 21 including a write management table 22, which will be described later.

Figure 16:
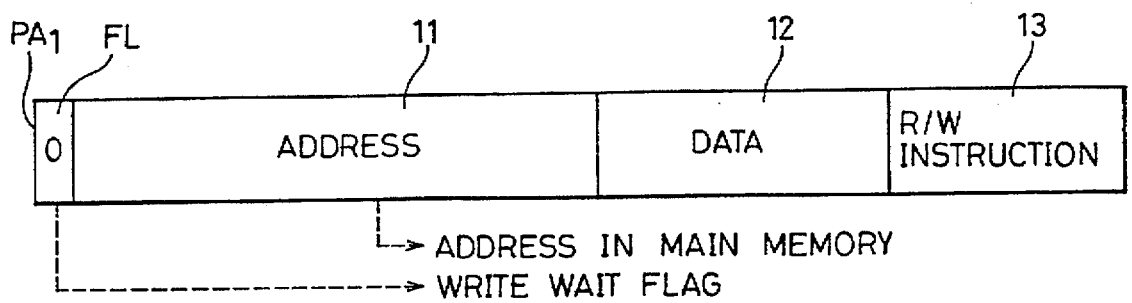
FIG. 16 shows a format of a data packet exchanged between the data driven processor and the cache memory unit in accordance with the second embodiment of the present invention.

Referring to FIG. 16, a data packet PA1 includes an address 11 for the access to the main memory, data 12 read from the memory or to be written to the memory, an W/R instruction 13 for designating write operation (W) to the main memory or read operation (R) from the main memory, and a write wait flag FL.

The flag FL is set to "1" when a data item has already been written in the corresponding write position (address) and reading of the data is not yet completed at the issuance of a write request, or when a data item has been already read from the corresponding read position (address) of the cache memory 1 and data writing has not yet been completed at the issuance of the read request. Otherwise it is reset to "0".

Figure 17:
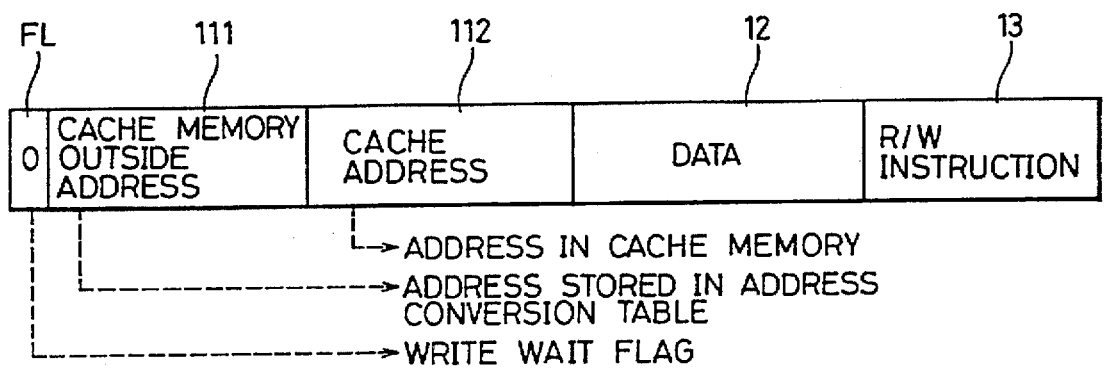
FIG. 17 shows a result of translation of the format shown in FIG. 16, in the address translating unit of FIG. 15.

When data packet PA1 of FIG. 16 is applied from the processor PE to cache memory unit CM1, address translation unit 41 operates in the following manner. Based on the contents of address conversion table 5, address translation unit 41 translates the contents in input packet PA1 in the manner shown in FIG. 17, as in the first embodiment. FIG. 17 differs from FIG. 12 showing the first embodiment only in that it additionally includes a flag FL. The structures of address conversion table 5 and of cache memory 1 are the same as those of the first embodiment, and therefore detailed description thereof will not be repeated here.

Figure 18:
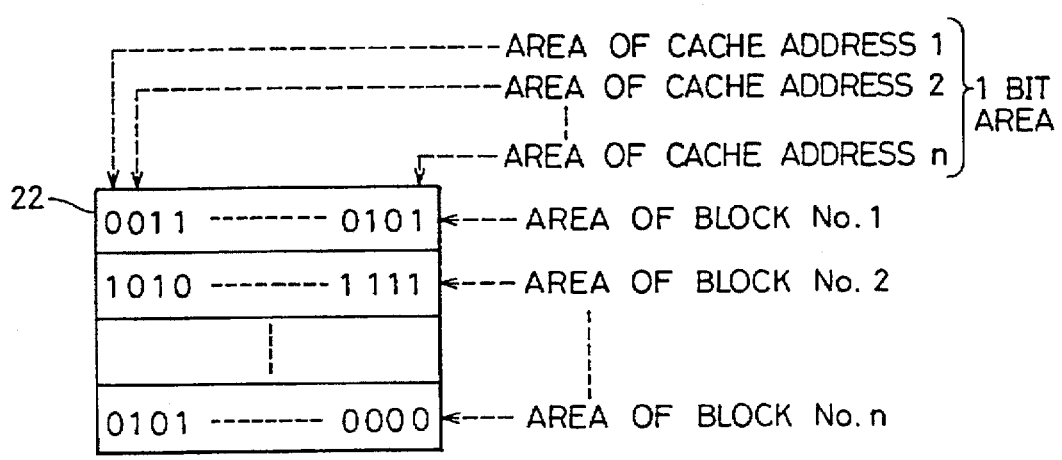
FIG. 18 shows a structure of a write management table of FIG. 15.

The structure of write management table 22 will be described with reference to FIG. 18.

The size of the write management table 22 is set in accordance with the size of cache memory 1. More specifically, cache memory 1 includes n blocks each including n addresses, as shown in FIG. 12. Therefore, table 22 includes an area for storing 1 bit of flag for each address of the cache memory 1.

Each flag in write management table 22 indicates, when it is "1", that data write to the address area of the corresponding cache memory 1 has already been completed but the data is not yet read. When it is "0", each flag indicates that the reading of data from the area has been completed but the next data is not yet written.

Write operation to the main memory in the cache memory unit CM1 in accordance with the second embodiment of the present invention shown in FIG. 15 will be described with reference to FIGS. 19, 20 and 21.

When a write request to the main memory is issued, the processor PE provides the data packet PA1 to cache memory unit CM1, with a write instruction (W) being set in the W/R instruction 13 of the packet. Instruction determining unit 3 of cache memory unit CM1 determines that the instruction 13 of the input packet PA1 is an write instruction (W), applies the determination result signal R/W to memory access unit 61, and applies the input packet PA1 to address translation unit 41.

Address translation unit 41 translates the address 11 of the input packet PA1 in accordance with the contents of the address conversion table 5 as described above, and separates the address 11 into a cache memory outside address and a cache address, as shown in FIG. 17. Address translation unit 41 determines whether the cache memory outside address is in the address conversion table 5 by searching table 5. Dependent on whether the cache memory outside address exists or not, address translation unit 41 applies a table search result signal SR to memory access unit 61.

When there is the cache memory outside address in table 5, address translation unit 41 reads the corresponding block number 113, replaces the cache memory outside address 111 with the corresponding block number 113, and applies the translation result signal CAD (including cache address 112 and block number 113) and the data packet PA1 to memory access unit 61. At this time, the search result signal SR assumes a value indicative of the existence of the corresponding block in the cache memory.

When the cache memory outside address is not in the table 5, address translation unit 41 selects one block in cache memory 1 by a prescribed algorithm, such as LRU, replaces the cache memory outside address 111 with the block number 113, and applies the translation result signal CAD (including cache address 112 and block number 113) and the data packet PA1 to memory access unit 61. At this time, the search result signal SR assumes a value indicative of the non-existence of the corresponding block in the cache memory 1.

In accordance with the determination result signal R/W indicative of the write instruction (W), memory access unit 61 applies address 11 of data packet PA1 to address write unit 7, applies data packet PA1 to input/output unit 9 and the translation result signal CAD to table management unit 21.

Figure 19:
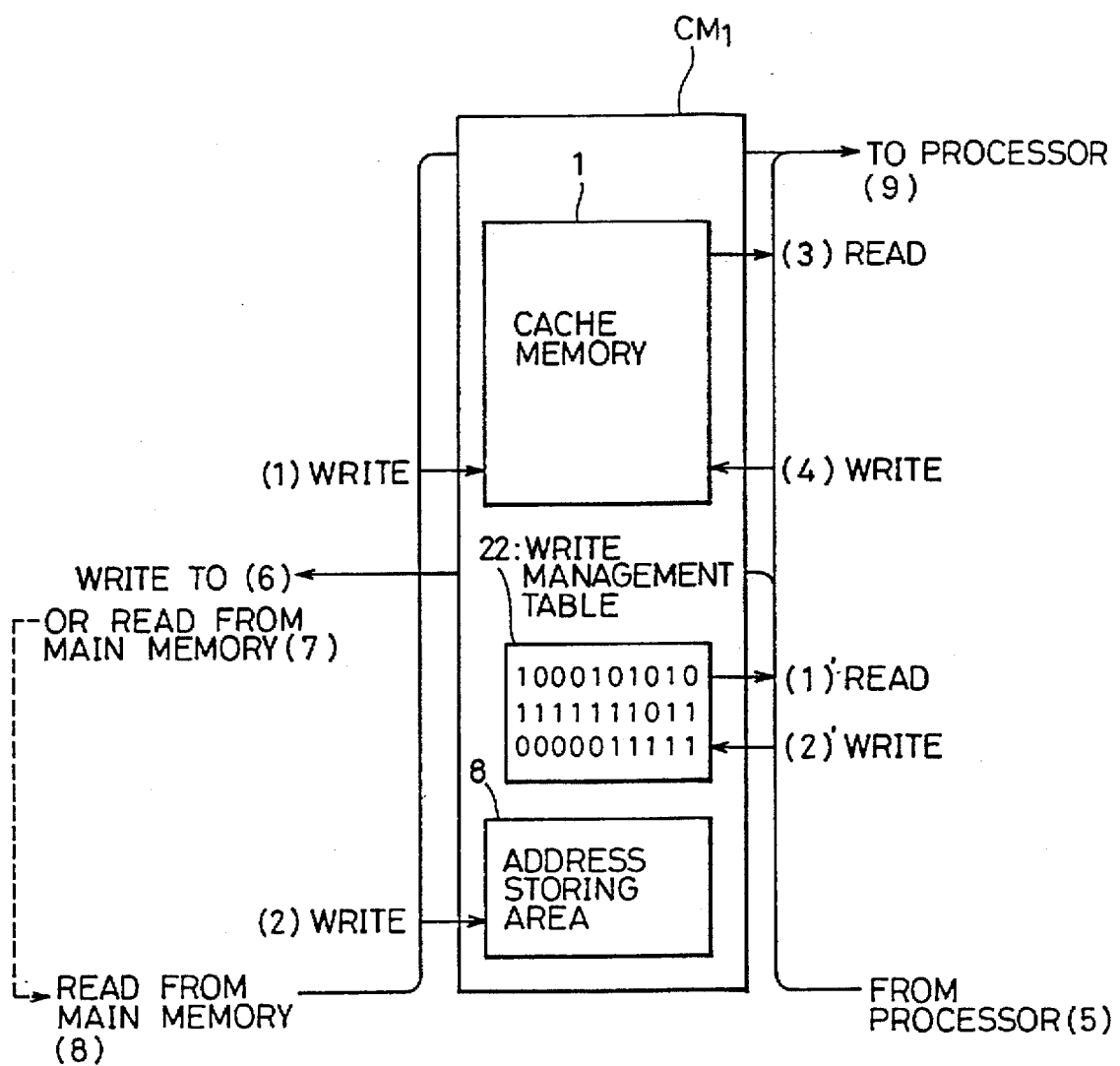
FIG. 19 schematically shows the operation of the cache memory unit shown in FIG. 15.
Figure 20:
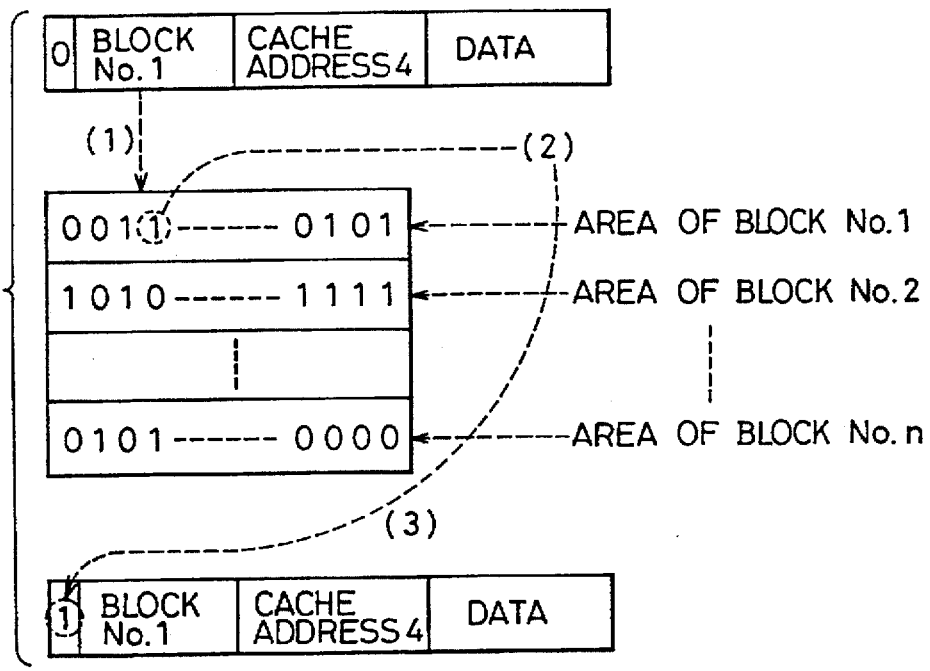
FIG. 20 shows contents of the write management table and transition of data in the data packet, when writing is not permitted at an issuance of a main memory write instruction, in the second embodiment of the present invention.

Address write unit 7 writes the applied address 11 and the block number of translation result signal CAD to address storing area 8 (see (2) of FIG. 19). In accordance with address designation based on the translation result signal CAD, table management unit 21 reads the flag from write management table 22 (see (1)' of FIG. 19 and (1) of FIG. 20), and applies the same as read data FR to memory access unit 61. Based on the applied data FR, memory access unit 61 determines whether or not the data item corresponding to the translation result signal CAD has been read from the cache memory 1, that is, whether the value of data FR is "0" or "1".

As a result of the above determination, if the data item has not yet been read (the value of data FR is "1": see (2) of FIG.

20), data 12 of data packet PA1 is not written to cache memory 1 or the main memory. Memory access unit 61 sets the flag data FD to "1" and applies it to input/output unit 9. Input/output unit 9 writes the FD to write wait flag FL of data packet PA1 and provides the data packet PA1 to the processor (see (9) of FIG. 19 and (3) of FIG. 20).

Figure 21:
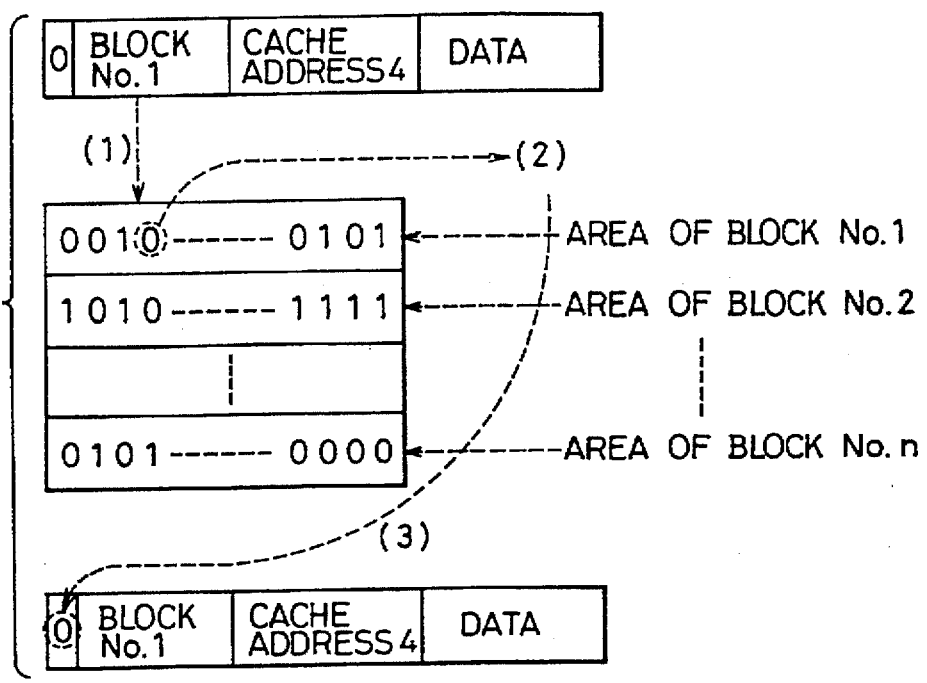
FIG. 21 shows contents of the write management table and transition of data in the data packet when writing is permitted at an issuance of a main memory write instruction, in the second embodiment of the present invention.

Meanwhile, if it is determined that the reading has been completed (the value of the read data FR is "0": see (2) of FIG. 21), memory access unit 61 applies an access request signal ACC (including data 12, block number 113 and cache address 112 of input packet PA1) to cache memory access unit 2.

In accordance with address designation based on block number 113 and cache address 112, cache memory access unit 2 writes data 12 in cache memory 1 (see (4) of FIG. 19). Since flag data FD is applied, input/output unit 9 applies an access request signal ACM (including address 11 and data 12 of data packet PA1) to memory interface unit VM. Through memory interface unit VM, data 12 is written to the main memory in accordance with address designation based on address 11 (see (6) of FIG. 19). Address write unit 7 writes the cache memory outside address and corresponding block number stored in address storing area 8 to address conversion table 5.

The operation when a main memory write instruction is issued is thus completed.

Reading operation from the main memory in the cache memory unit CM1 of FIG. 15 will be described with reference to FIGS. 19, 22 and 23.

When there is a read request issued by the main memory, the processor PE applies data packet PA1 to cache memory unit CM1 with a read instruction (R) set in the W/R instruction 13. Referring to FIG. 15, instruction determining unit 3 of cache memory unit CM1 determines that the W/R instruction 13 of the input packet PA1 is a read instruction (R), and applies the determination result signal R/W to memory access unit 61. Instruction determining unit 3 also applies the data packet PA1 to address translation unit 41.

Address translation unit 41 receives the applied data packet PA1 and translates the same in accordance with the format such as shown in FIG. 17. Address translation unit 41 determines whether the cache memory outside address is in the address conversion table 5 or not by searching the table 5. Based on whether the cache memory outside address is found, address translation unit 41 applies a table search result signal SR to memory access unit 61.

When the cache memory outside address is found in the table 5, address translation unit 41 reads the corresponding block number 113, replaces the cache memory outside address 111 with the block number 113, and applies the translation result signal CAD (including cache address 112 and block number 113) and data packet PA1 to memory access unit 61. At this time, the search result signal SR assumes a value indicative of the existence of the corresponding block in the cache memory.

When the cache memory outside address is not in the table 5, address translation unit 41 selects one block of cache memory 1 in accordance with a prescribed algorithm such as LRU, replaces the cache memory outside address 111 with the block number 113, and applies the translation result signal CAD (including cache address 112 and block number 113) and data packet PA1 to memory access unit 61. At this time, the search result signal SR is set to a value indicative of the non-existence of the corresponding block in the cache memory 1.

Based on the determination result signal R/W indicative of the read instruction (R), memory access unit 61 applies the translation result signal CAD to table management unit 21. In accordance with address designation based on the signal CAD, table management unit 21 reads a flag from write management table 22 (see (1)' of FIG. 19 and (1) of FIG. 22) and applies it as data FR to memory access unit 61. Based on the applied data FR, memory access unit 61 determines whether or not the data corresponding to the translation result signal CAD is written in cache memory 1.

As a result of the above determination, if it has been written (when the value of the read data FR is "1"), memory access unit 61 applies the write data FW of "0" to table management unit 21. Table management unit 21 rewrites the flag corresponding to the translation result signal CAD of table 22 from "1" to "0" by using write data FW (see (2)' of FIG. 19 and (2) of FIG. 22). Thereafter, memory access unit 61 applies the access request signal ACC to cache memory access unit 2.

Figure 22:
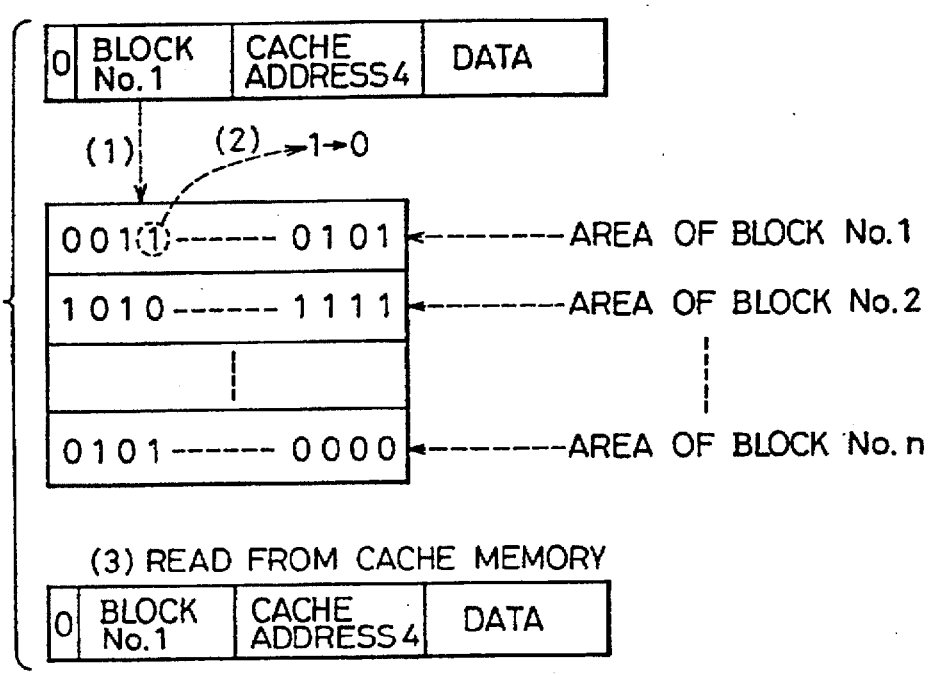
FIG. 22 shows contents of the write management table and transition of data in the data packet when reading is permitted at an issuance of a main memory read instruction, in the second embodiment of the present invention.
Figure 23:
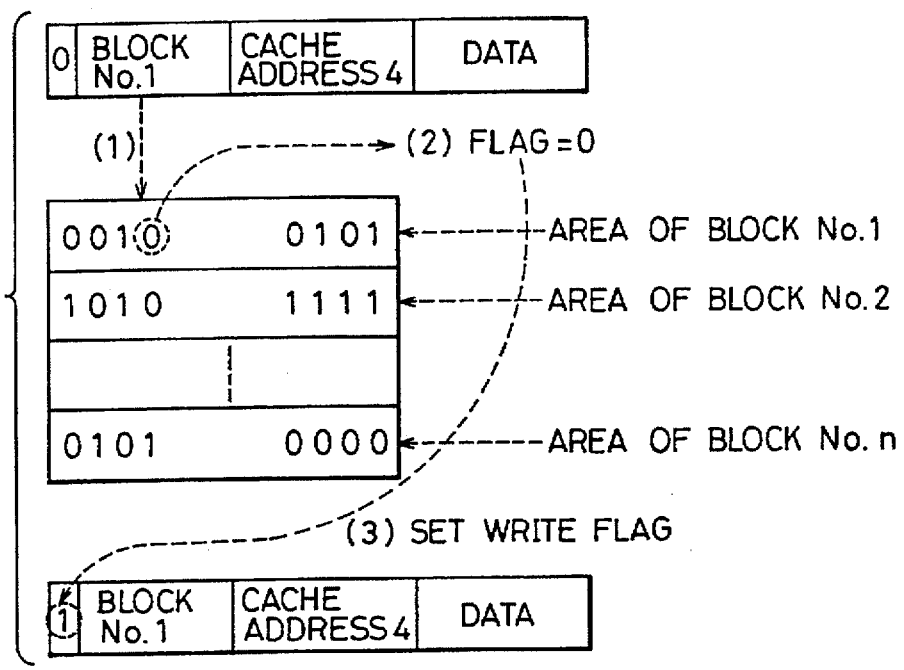
FIG. 23 shows contents of the write management table and transition of data in the data packet when reading is not permitted at an issuance of a main memory read instruction, in the second embodiment of the present invention.

In response, cache memory access unit 2 reads data from cache memory 1 in accordance with address designation based on the cache address 112 and block number 113 (see (3) of FIG. 19 and (3) of FIG. 22), and applies the read data CRD to memory access unit 61. Memory access unit 61 applies data CRD and packet PA1 to input/output unit 9. Input/output unit 9 sets data CRD at data 13 of packet PA1, and provides the packet PA1 to the processor PE (see (9) of FIG. 19).

Meanwhile, as a result of determination mentioned above, if the data has not yet been written (when the value of the read data FR is "0"), memory access unit 61 applies the data packet PA1 to input/output unit 9. Input/output unit 9 applies the address 11 of data packet PA1 as an access request signal ACM to memory interface unit VM (see (7) of FIG. 19). In accordance with address designation based on the access request signal ACM, memory interface unit VM reads data from the main memory, and applies the read data MRD to memory access unit 61 through input/output unit 9 (see (8) of FIG. 19). Memory access unit 61 receives the read data MRD, and applies address 11 of input packet PA1 and a block number in translation result signal CAD to address write unit 7. Address write unit writes these to address storing area 8 (see (2) of FIG. 19).

Memory access unit 61 applies the applied data MRD and the translation result signal CAD as an access request signal ACC to cache memory access unit 2. Memory access unit 2 writes data MRD to cache memory 1 in accordance with the address designation based on the signal CAD (see (1) of FIG. 19). Memory access unit 61 applies flag data FD set to "1" to input/output unit 9. Input/output unit 9 sets the read data MRD to data 13 of data packet PA1. Further, input/output unit 9 rewrites the flag FL from "0" to "1" by using the data FD, and provides the data packet PA1 to processor PE (see (9) of FIG. 19 and (3) of FIG. 23).

In response to the write wait flag FL of data packet PA1 being "1", the processor PE determines that the data corresponding to address 11 of the data packet PA1 is in the read wait state. Address write unit writes the cache memory outside address stored in address storing area 8 and the block number to address conversion table 5.

As described above, in accordance with the second embodiment, the timing control with respect to read/write from and to the main memory can be effected by using the write management table 22 related to the cache memory 1, and therefore side effects on the data can be prevented. More specifically, an attempt of reading of data before the data is written to the main memory or writing of new data before data reading (destruction of data by overwriting) can be prevented. Since cache memory 1 has a small capacity, the circuit for such timing control may be made smaller than the one for the main memory.

Third Embodiment

The third embodiment will be described. The data driven information processing system in accordance with the third embodiment has similar structure as those of the first embodiment, and therefore detailed description thereof will not be repeated here. The third embodiment relates to a method of efficiently operating the system shown in the first embodiment.

In data driven information processing system such as image processing, such operation is frequently carried out that the data items are loaded (written) in the main memory at first, and the processings of the sets of data items which have been loaded are carried out while the sets of the data items to be processed are moved successively. In the system of the present invention, the data items are loaded in the cache memory 1 as well, parallel to data loading to the main memory. Therefore, before the data items loaded in cache memory 1 are overwritten by subsequent data to be loaded to the main memory, the data items may be read from the cache memory and used for other processings. As a result, by adjusting timings of data loading and execution of a prescribed processing, data loading and a prescribed processing can be carried out in parallel, enabling efficient processings.

Figure 24:
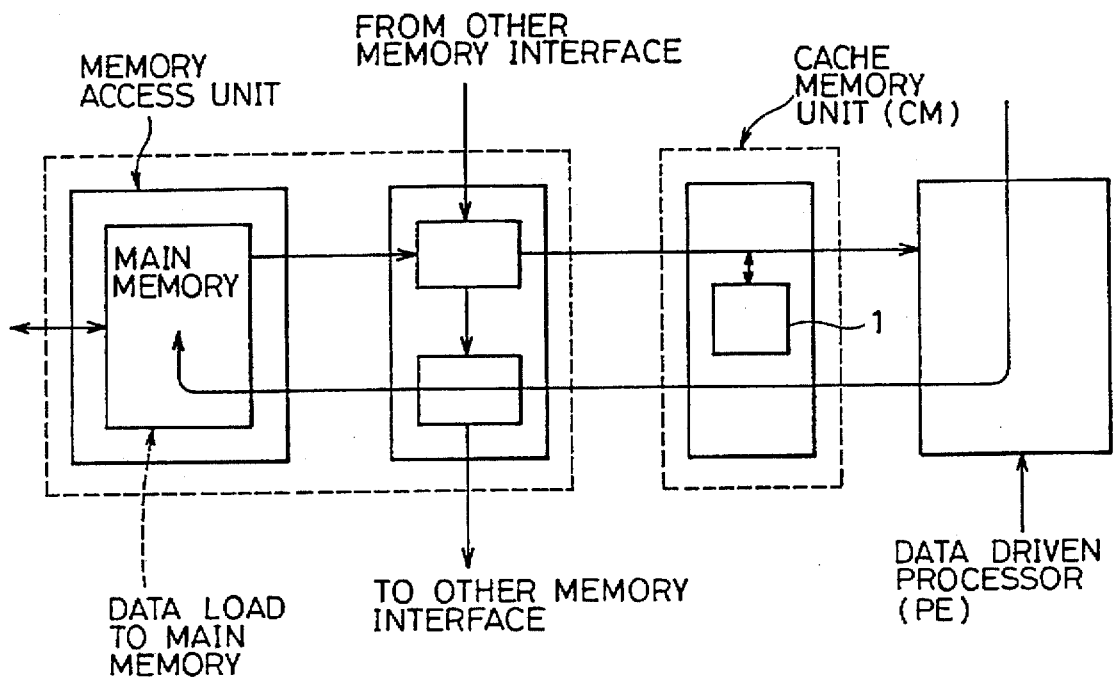
FIG. 24 schematically shows the flow of data when data are loaded only to the main memory in the system of FIG. 25.

Referring to FIG. 24, when a series of data items such as initial values are loaded by the processor PE to the main memory, generally data items are not written to the cache memory 1. Since the capacity of cache memory 1 is far smaller than that of the main memory, it is considered meaningless to write the data items to the cache memory 1 at the time of loading, as the written data items are merely overwritten by the succeeding data items.

Figure 25:
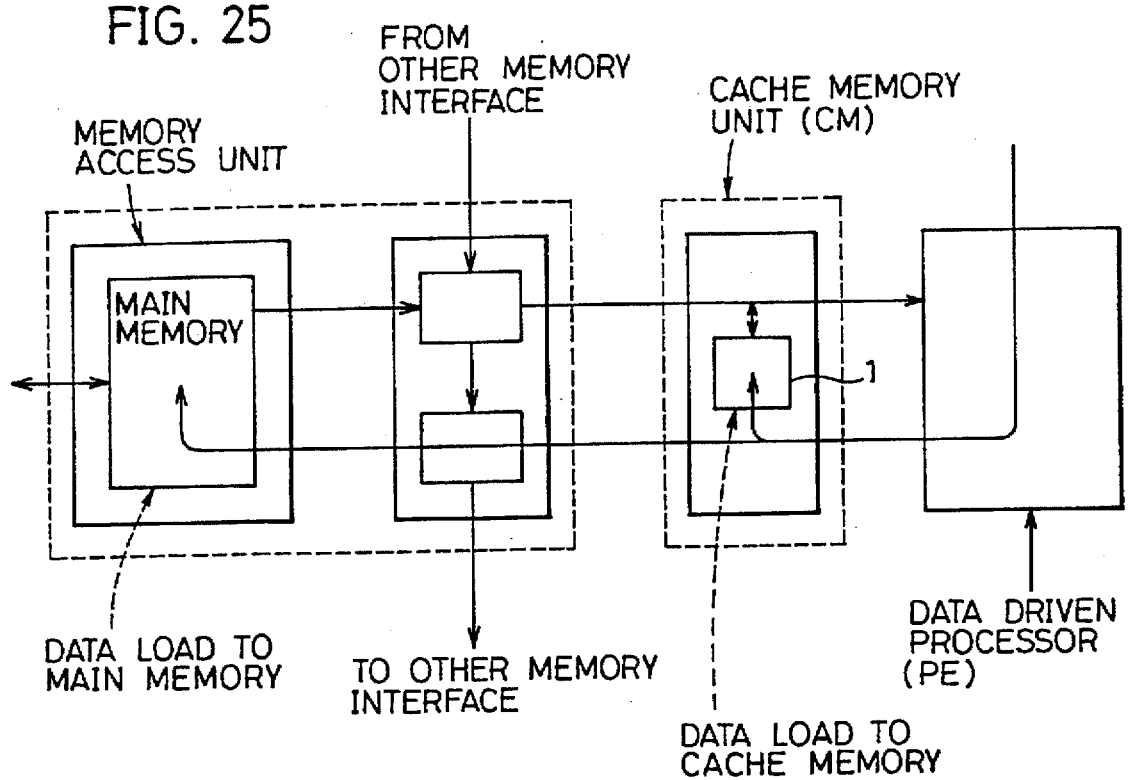
FIG. 25 schematically shows the flow of data when data are loaded to the main memory and to the cache memory simultaneously, in the data driven information processing system in accordance with a third embodiment of the present invention.

Assume that a series of data items are each written simultaneously to the main memory and the cache memory 1 as shown in FIG. 25. Further, assume that data load to the main memory and the cache memory 1 can be carried out in parallel to the data processing including access (read/write) to the cache memory 1. At this time, before the data item in the cache memory 1 is overwritten by the succeeding data item, the data item in the cache memory can be used for the data processing. The efficiency of processing becomes the highest.

Figure 26:
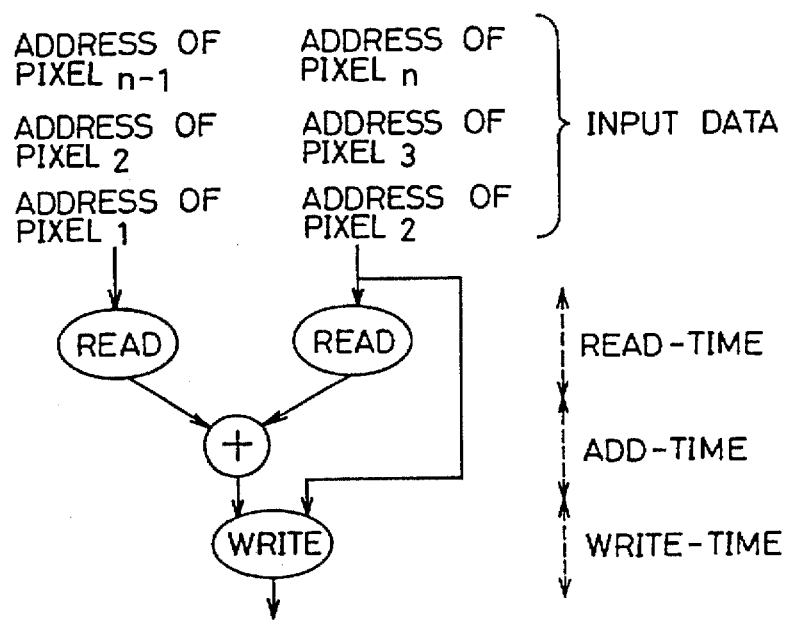
FIG. 26 is a flow graph diagram showing a part of an image data processing program.

FIG. 26 shows addition of data of adjacent pixels (hereinafter simply referred to as pixels) in image data processing. This processing is very frequently carried out in image processing, and increased speed of operation in this processing is strongly desired.

Referring to FIG. 26, first, an address of pixel 1 and an address of pixel 2 as input data are provided from the processor PE and applied to cache memory unit CM. Corresponding pixels 1 and 2 are successively read from the memory (main memory or cache memory) and transmitted to processor PE. The time necessary for these operations will be referred to as read_time (read response time).

Processor PE adds the received two pixels. The time required for this addition will be referred to as add_time (addition instruction execution time).

Processor PE writes the result of addition to an area corresponding to the address of pixel 2 in the memory (main memory or cache memory 1). The time necessary for this operation is referred to as write_time (write response time).

Similar processings are carried out repeatedly. In general, a process for adding pixel n and pixel n-1 and writing the result to the area of pixel n-1 in the memory is carried out repeatedly.

When the processings of FIG. 26 are carried out repeatedly for respective pixels, the time necessary for the entire processing (total execution time) is calculated in accordance with the following equation:

$$\text{Total execution time} = (\text{read\_time} + \text{add\_time} + \text{write\_time}) \times \text{total pixel number} \quad (1)$$

Figure 27:
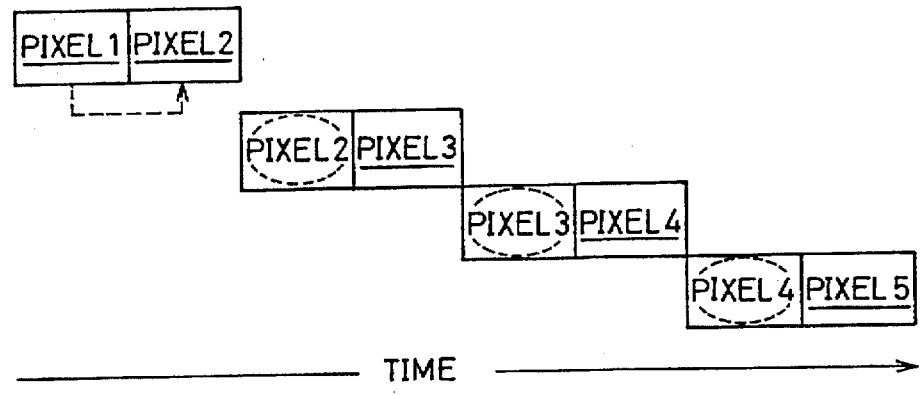
FIG. 27 illustrates the operation of the system in accordance with the third embodiment when data processing in accordance with the flow graph diagram of FIG. 26 is executed in parallel to the data loading of FIG. 24.

Now, referring to FIG. 27, the following problem arises when the processing starts from reading of the pixel. Normally, a part of the pixel group to be read is not written in cache memory 1. It becomes necessary to read the part of the pixel group from the main memory in each processing. For example, referring to FIG. 27, in the first processing, pixel 1 and pixel 2, in the second processing, pixel 3, in the third processing, pixel 4, must be read from the main memory. More specifically, underlined pixels in FIG. 27 must always be read from the main memory. The time necessary for reading the pixel from the main memory is referred to as main_read_time (main memory access time). In this case, the above equation (1) would be:

$$\text{Total execution time} = (\text{main\_read\_time} + \text{add\_time} + \text{write\_time}) \times \text{total pixel number} \quad (2)$$

Figure 28:
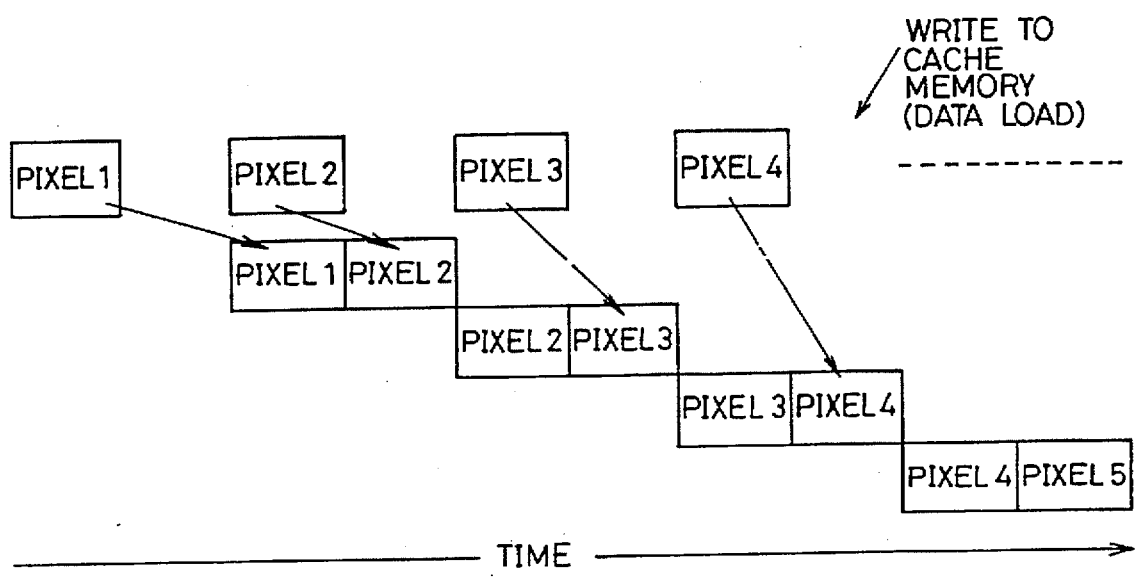
FIG. 28 shows an operation of the system in accordance with the third embodiment when the data processing is executed in accordance with the flow graph diagram of FIG. 26 in parallel to data loading of FIG. 25.
Figure 37:
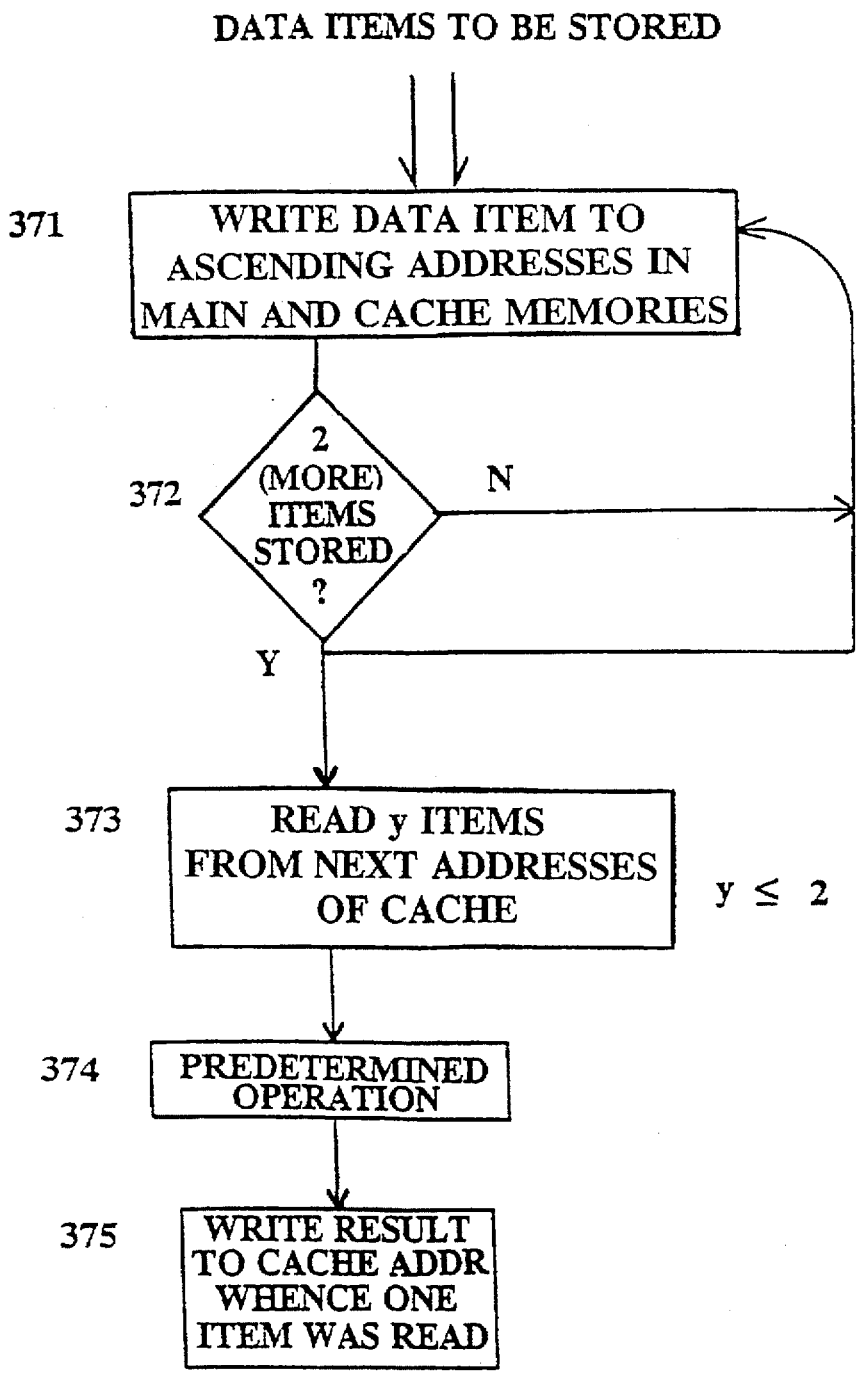
FIG. 37 shows a flow diagram illustrating a parallel-processed method which may be implemented using the present invention.

Let us consider the processing shown in FIG. 28. Referring to FIG. 28, assume that while the data loading to the main memory is carried out continuously (step 371; FIG. 37), data loading to the cache memory 1 is carried out simultaneously. Assume that the processing of FIG. 25 starts simultaneously with the end of writing (data load) of pixel 1 (e.g. "2" in step 372), and that the processings proceed with reading of pixels (e.g. "y" pixels; step 373), addition (or other predetermined operation; step 374) and writing (step 375) are repeated periodically in the similar manner. In that case, the pixel necessary for the processing of FIG. 26 is always written in cache memory 1 when the processing takes place, and therefore the access to the main memory never occurs. Since data loading and processing of FIG. 25 (consumption of the loaded data) take place in parallel with each other (not the "yes" branch of step 372), the data item necessary for the processing is not overwritten by the subsequent data item in cache memory 1.

Referring to FIG. 37, after a first number of data items has been written (372), a second number of the data items is read out from cache (373). The first number of data items may be two, for example, and the second number of data items (y) may also be two. The read data items are then subjected to a predetermined operation (374) and the result of the predetermined operation is written to one of the cache addresses where one of the data items was read from (375). Because step 371 is performed continually with the receipt of data items to be stored, it will be performed in parallel with the reading of step 373. In addition, by the time step 375 is reached, the number of data items written in the meantime by step 371 may have triggered the "yes" branch of step 372 again, thus resulting in the parallel processing of steps 371, 373, and 375.

When the time necessary for reading pixels from cache memory 1 is represented by cache_read_time (cache memory access time), the above equation (1) would be:

$$\text{Total execution time} = (\text{cache\_read\_time} + \text{add\_time} + \text{write\_time}) \times \text{total pixel number} \quad (3)$$

Since main_read_time>>cache_read_time holds, the total execution time of the processings becomes shorter than that in accordance with FIG. 27 when the processings are executed in accordance with the schedule as shown in FIG. 28.

Fourth Embodiment

The data driven information processing system in accordance with a fourth embodiment includes a plurality of data driven processors, a plurality of cache memory units and a plurality of memory interface units. Each processor can access to any arbitrary main memory through one cache memory. Access efficiency from each processor to the main memory can be improved without providing a cache memory for each of the main memories.

Figure 29:
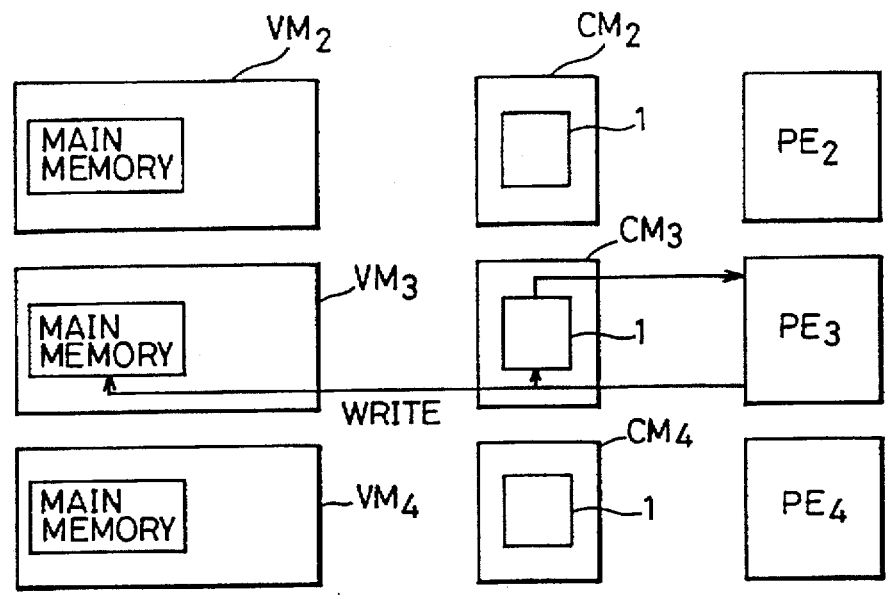
FIG. 29 schematically shows a data write operation with the combination of the cache memory and the main memory fixed.
Figure 30:
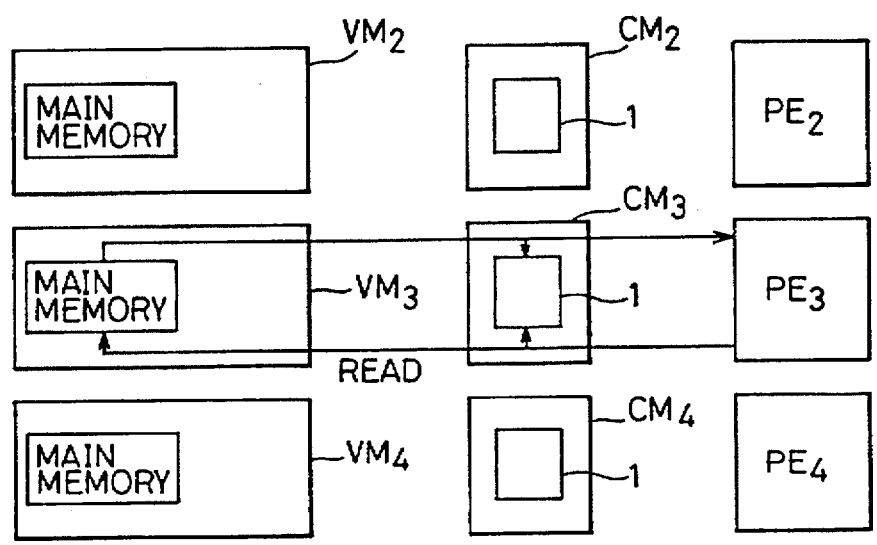
FIG. 30 schematically shows data read operation with the combination of the cache memory and the main memory fixed.

The system shown in FIGS. 29 and 30 includes data driven processors PE2, PE3 and PE4; cache memory units CM2, CM3 and CM4; and memory interface units VM2, VM3 and VM4. Each of the cache memory units CM2, CM3 and CM4 includes a cache memory 1, and each of memory interface units VM2, VM3 and VM4 includes a main memory.

In this embodiment also, between the processor and the cache memory unit, data packet PAl including data is transmitted. FIG. 29 shows data path at the time of data writing by the processor PE3 to the main memory of the memory interface unit VM3. FIG. 30 shows data path at the time of data reading by the processor PE3 from the main memory of memory interface unit VM3.

When the system of FIGS. 29 and 30 are implemented by the data driven processor, the cache memory unit and the memory interface unit of the first to third embodiments above, access through the same block of a cache memory 1 is not possible if the main memory is not the same. If the main memories are different, the corresponding addresses 11 are different, and if the addresses 11 are different, the corresponding block numbers of cache memory 1 are different.

However, there is certainly a case that a processor reads data from a read only main memory and writes the data to another main memory. When the system shown in FIGS. 29 and 30 is implemented by the first to third embodiments, the data item read from the read only main memory and stored in the corresponding cache memory 1 cannot be further utilized, and the area (block) would be wasted.

Figure 31:
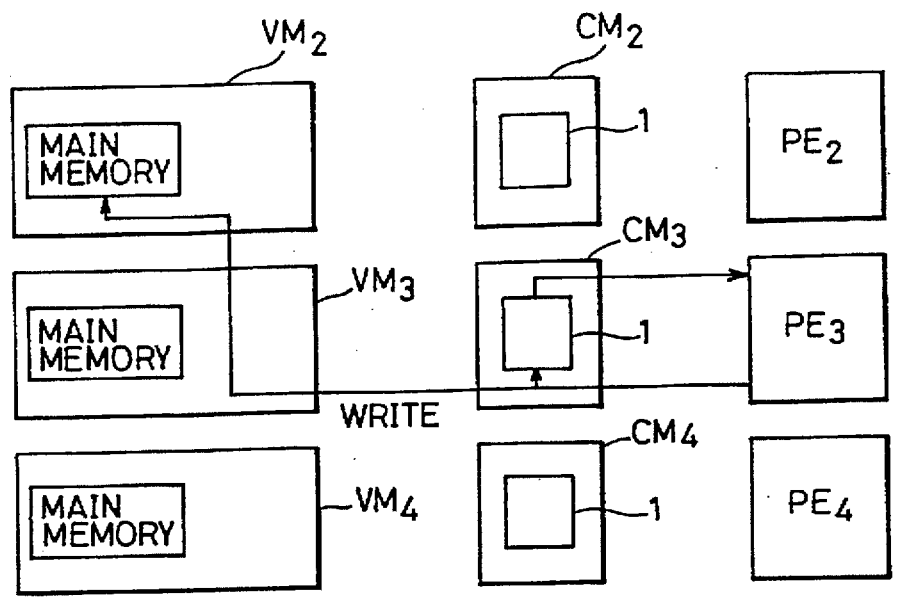
FIG. 31 schematically shows a data write path when a plurality of main memories are accessed through a single cache memory in accordance with a fourth embodiment of the present invention.
Figure 32:
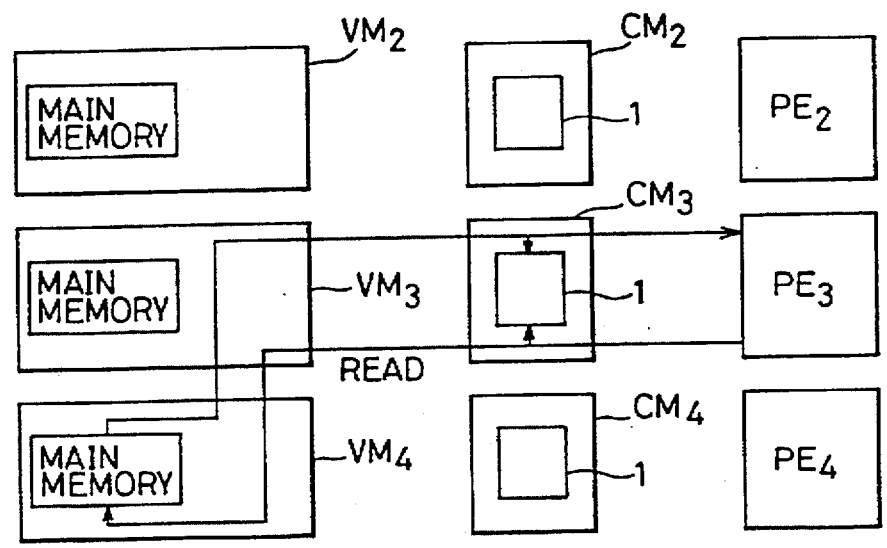
FIG. 32 schematically shows a data read path when a plurality of main memories are accessed through a single cache memory in accordance with a fourth embodiment of the present invention.

The present embodiment is directed to avoidance of such wasted area in the cache memory 1. For this purpose, in the present embodiment, one and the same area of the cache memory 1 is adapted to be used as a read area (block) as well as a write area (block), as shown in FIGS. 31 and 32.

Figure 33:
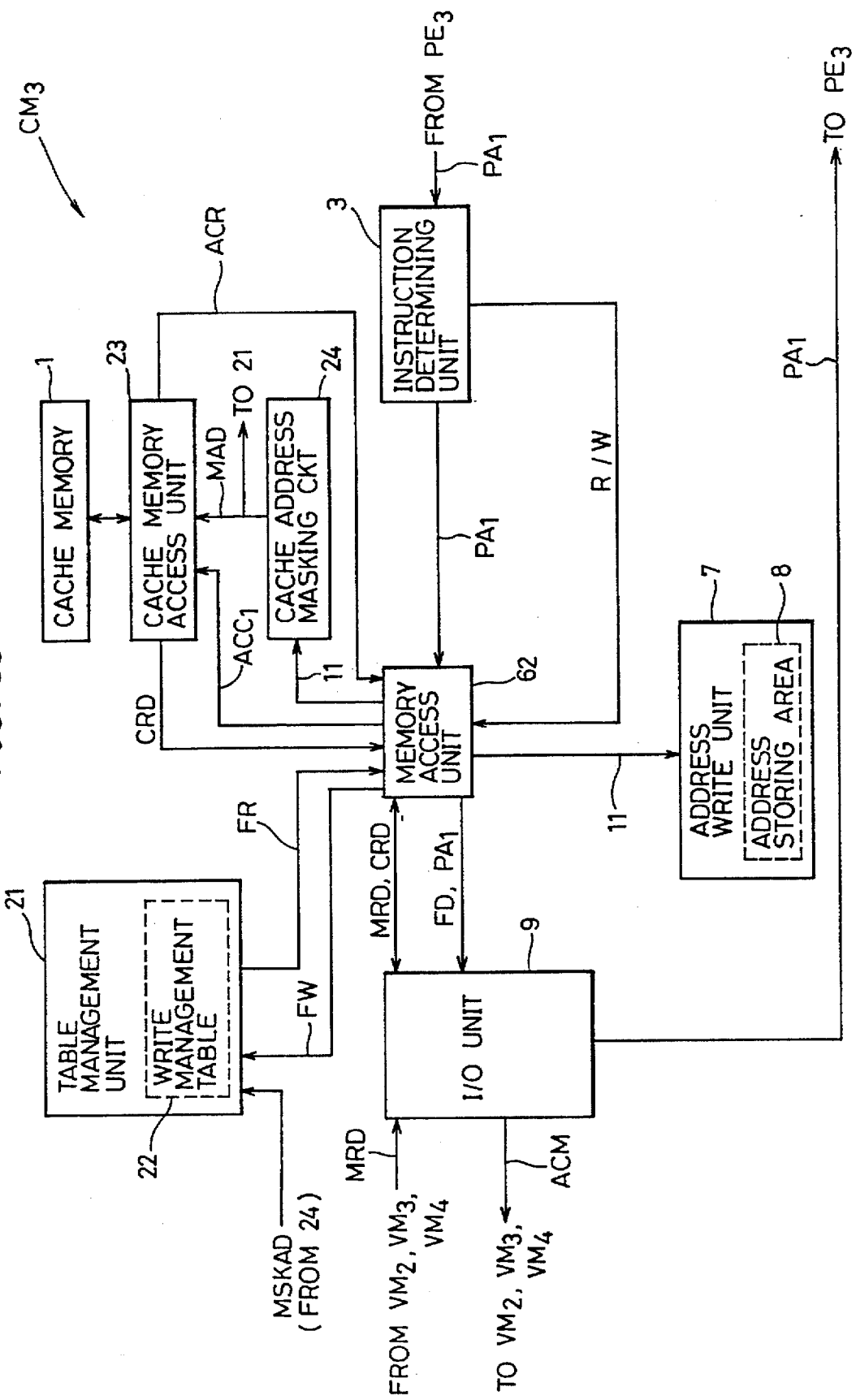
FIG. 33 is a block diagram of a cache memory unit in accordance with a fourth embodiment of the present invention.

Block structure of a cache memory unit included in the system of this embodiment is shown in FIG. 33. Here, a cache memory unit CM3 is shown. Other cache memory units CM2 and CM4 have structures similar to that shown in FIG. 33.

The cache memory unit CM3 of FIG. 33 differs from the cache memory unit CM1 of FIG. 15 in that it does not include address translation unit 41 of FIG. 15, that it includes a cache memory access unit 62 and a cache memory access unit 23 in place of memory access unit 61 and cache memory access unit 2, respectively, and that it additionally includes a cache address masking circuit 24 related to the access to the cache memory 1. Since address structures of the cache memory unit CM3 are the same as those of FIG. 15, detailed description thereof will not be repeated here.

Referring to FIG. 33, memory access unit 62 receives a data packet PAl from processor PE3 through instruction determining unit 3, and applies address 11 stored in the data packet PA to cache address masking circuit 24.

Figure 34:
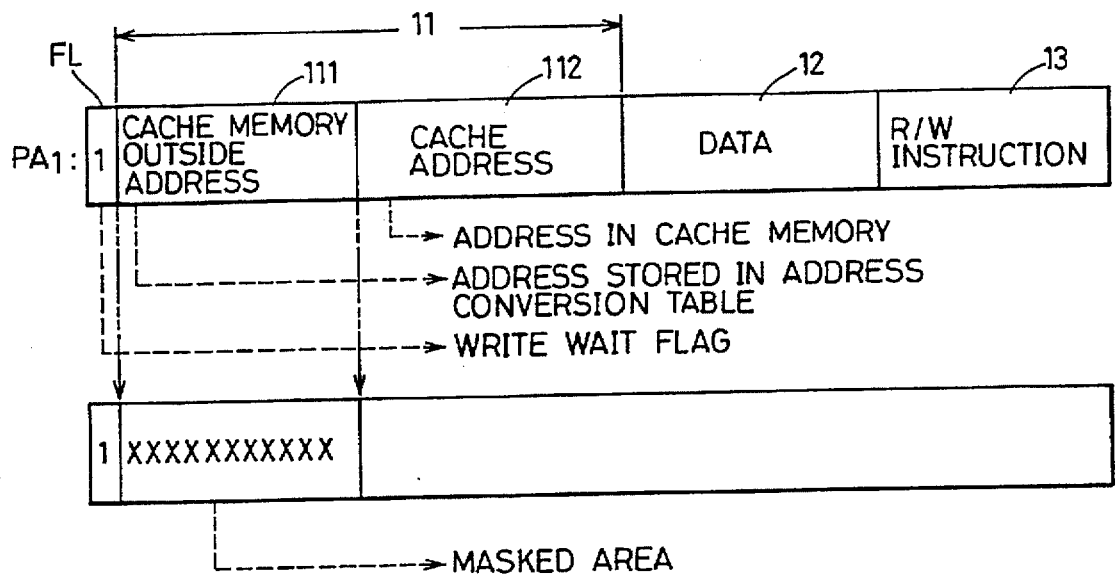
FIG. 34 illustrates masking operation with respect to an address for cache memory access by a cache address masking circuit of FIG. 33.
Figure 35:
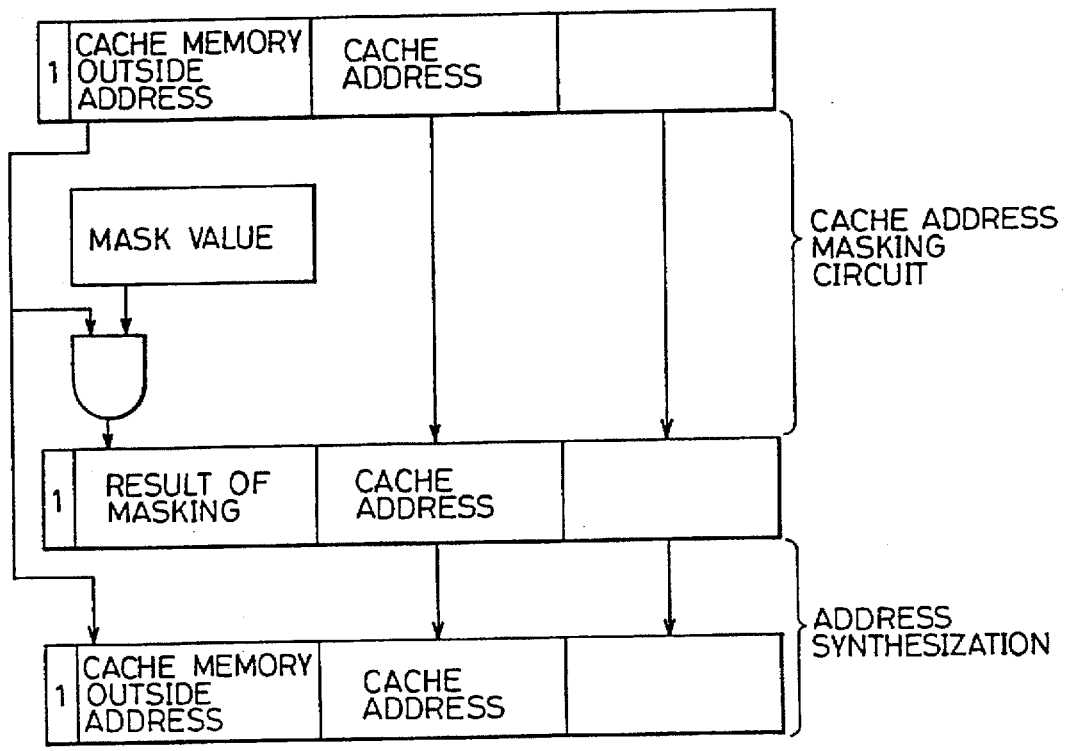
FIG. 35 illustrates an operation for converting the address obtained by the masking operation shown in FIG. 34 to an address for accessing to the main memory.

Cache address masking circuit 24 masks a portion corresponding to the cache memory outside address 111 of address 11. To "mask" here means to calculate an AND of a bit pattern of the cache memory outside address 111 shown in FIG. 34 and a prescribed bit pattern (hereinafter referred to as a masking value) and to replace the cache memory outside address 111 with the result of calculation. This operation is shown in FIG. 35. The cache memory outside address thus masked is used to access the cache memory, as the block number of the cache memory.

Assume that the cache memory outside address 111 includes 9 bits. For example, if it is masked by "000000000", the cache memory outside address 111 comes to be "000000000". In that case, the block number allotted to all cache memory outside addresses would be "0". Therefore, in this case, the block number of the cache memory 1 is 1. As another example, if it is masked by "000000001", the cache memory outside address 111 would be "000000000" or "000000001". In that case, the block number to be allotted to the cache memory outside address would be "0" or "1" dependent on the least significant bit of the cache memory outside address. The cache memory 1 is used divided into two blocks. More specifically, main memories are accessed through two common blocks of cache memory 1.

Cache address masking circuit 24 applies the obtained block number and the cache address 112 in address 11 as masked address MSKAD to cache memory access unit 23. Memory access unit 23 accesses cache memory 1 in accordance with address designation by address MSKAD. When the mask value is "000000000", main memories in memory interface units VM2, VM3 and VM4 are accessed through a single block in cache memory 1 by processor PE3.

By setting the masking value variable, the number of blocks of the cache memory 1 used for accessing respective main memories can be variably set. If the masking value is set to "000000001", the number of blocks of cache memory 1 will be 2, as mentioned above. As can be easily understood, the number of blocks commonly used for accessing a plurality of main memories can be represented by $2^n$, where n represents the number of "1" in the masking value.

By the mask described above, it becomes possible to share one cache memory 1 for the access to all the main memories.

Returning to FIG. 33, as for the access to the main memory, the address 11 in data packet PAl is applied as it is to each memory interface unit. More specifically, memory access unit 62 applies the received data packet PAl to input/output unit 9. Input/output unit 9 applies the address 11 of the received data packet PAl as an access request signal ACM to a corresponding memory interface unit. The operations by the memory access unit 62 and input/output unit 9 are the reverse of the operation of the cache address masking circuit 24 as shown in FIG. 35.

Figure 36:
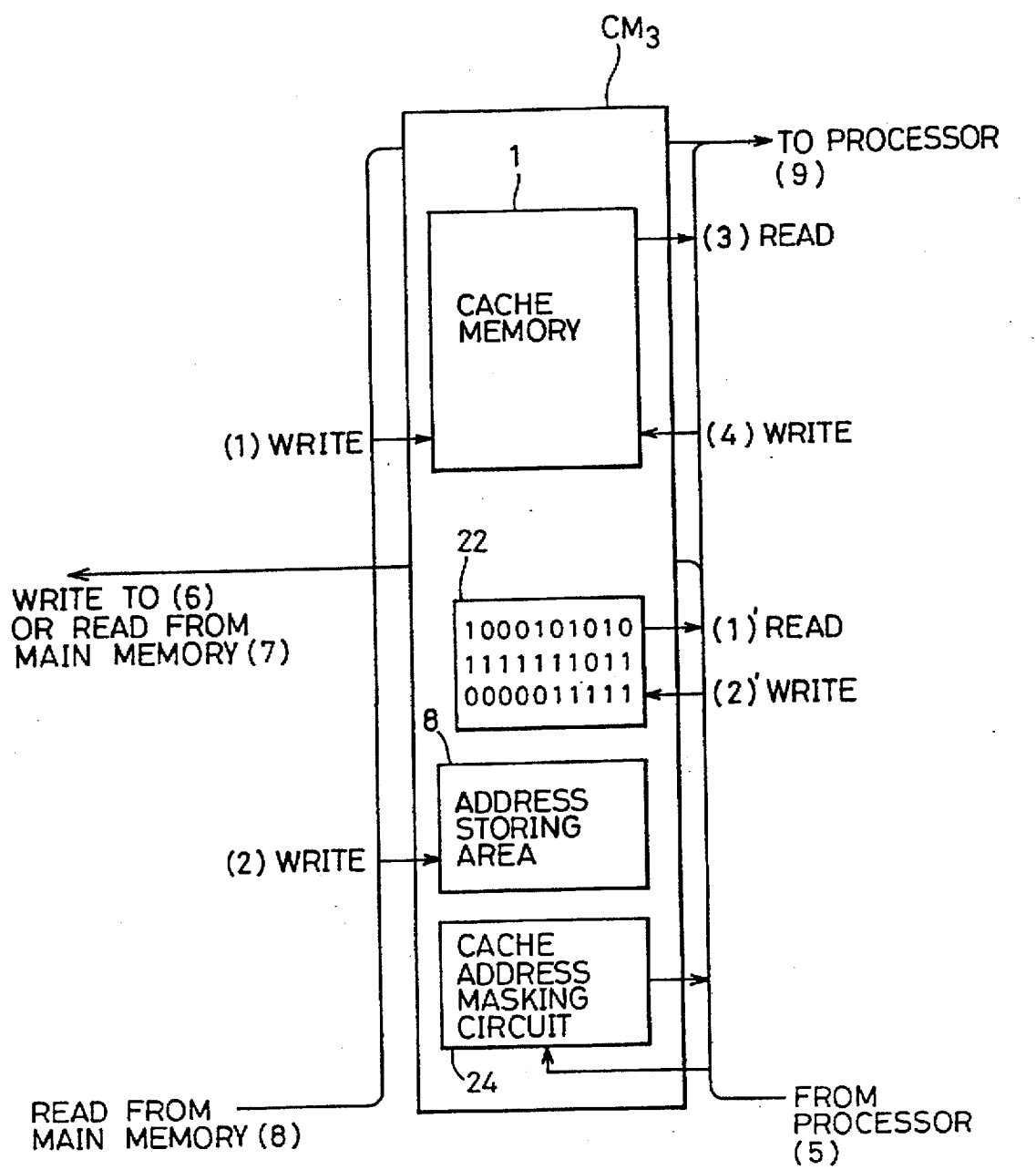
FIG. 36 is a schematic diagram showing the operation of the cache memory unit shown in FIG. 33.

FIG. 36 schematically shows the operation of cache memory unit CM3 of FIG. 33. Though FIG. 36 is similar to FIG. 19, it is different from FIG. 19 in that in the example of FIG. 36, read (3) and writes (1) and (4) from and to the cache memory are executed in accordance with address designation based on the result of masking (masked address MSKAD) of the cache address masking circuit 24. Other portions of FIG. 36 are the same as those of FIG. 19, and therefore detailed description thereof will not be repeated here.

As described above, according to the fourth embodiment, each processor can access different main memories through a single cache memory. It is not necessary to provide a cache memory for each main memory, and therefore the main memory can be accessed at higher speed without increasing the circuit scale. Therefore, a process such as accessing two main memories alternately, one of which main memories used only for reading and the other only for writing, can be executed at high efficiency.

As described above, according to the data driven information processing system in accordance with the present invention, when a data read instruction is issued by the main memory, corresponding data item is read from the cache memory instead of the main memory. Since the data item is read from the cache memory which can be accessed at higher speed than the main memory, the data read can be carried out at higher speed.

In the data driven information processing system in accordance with the present invention, timing control with respect to read/write from and to the main memory is effected based on the information in a table provided corresponding to the cache memory. Side effect on the data such as an attempt to read a data item before the data item is written, or write a new data item on a area from which a data item is not yet been read (overwriting) at the access to the main memory can be prevented. Since the cache memory has smaller capacity and the write management table may have relatively small scale, the above described timing control is possible without increasing the circuit scale.

In the data driven information processing system of the present invention, data items are loaded to the main memory and the cache memory simultaneously. Therefore, it is possible to execute a prescribed processing by reading a data item which is the same as that loaded in the main memory from the cache memory, which can be accessed at higher speed than the main memory, while further loading data items to the main memory. Before the data item which has been written in the cache memory is overwritten by the subsequent data item, the prior data item can be used effectively. Therefore, the prescribed processing and data loading can be effected at highest efficiency.

Further, in accordance with the data driven information processing system of the present invention, when any of a plurality of main memories is to be selectively accessed, the address for the accessing is converted to correspond to an address space in a common cache memory. All main memories can be accessed through a single cache memory. It is not necessary to prepare excessive cache memories. Access to the main memory at higher speed is possible while simplifying the system structure.

Although the present invention has been described and illustrated in detail, it is clearly understood that the same is by way of illustration and example only and is not to be taken byway of limitation, the spirit and scope of the present invention being limited only by the terms of the appended claims.

What is claimed is:

1. A data driven information processing system, comprising:
   a data driven processor;
   a main memory for storing data to be processed by said data driven processor;
   cache memory means accessible at higher speed than said main memory, provided between said data driven processor and said main memory for storing at least a part of contents of said main memory; and
   memory access means connected to said data driven processor, to said cache memory means and to said main memory, responsive to an access instruction from said data driven processor to said main memory, for accessing said cache memory means, said main memory or both for inputting/outputting data between said data driven processor and said main memory or said cache memory means, and for maintaining said cache memory means such that contents in said cache memory means are coherent with the contents of said main memory, said memory access means including address translation means having a table storing an address of said main memory in relation to an address of said cache memory where a copy of the contents of the main memory address is stored, operative in response to an access instruction applied from said data driven processor, for providing a determination result signal indicative of which of said main memory and said cache is to be accessed based on address information included in the access instruction applied from said data driven processor and on the contents of said table, and for providing an address to be accessed of said main memory or said cache memory,
   wherein said memory access means further includes:
   means for storing information specifying an access mode for each predetermined unit area of said cache memory means, the access mode inhibiting writing to a corresponding unit area when the access mode specifies that data has been written to but not yet read from the corresponding unit area, and inhibiting reading from the corresponding unit area when the access mode specifies that data has been read from but not yet overwritten at the corresponding unit area.

2. The data driven information processing system according to claim 1, wherein said memory access means includes:
   maintaining means having an input connected to said data driven processor, and first and second input/output circuits, said first input/output circuit connected to said cache memory means, said maintaining means for maintaining correlation between stored contents of said cache memory means and stored contents of said main memory and, responsive to an access instruction from said data driven processor to said main memory, for issuing an access instruction to said cache memory means at said first input/output circuit, or an access instruction to said main memory at said second input/output circuit, or both at respective input/output circuits, based on said correlation; and
   input/output means having an input/output connected to said second input/output circuit of said maintaining means and said main memory, and an output connected to said data driven processor, responsive to the access instruction to said main memory applied from said maintaining means for accessing said main memory to input/output data, and for transferring data between said main memory and each of said data driven processor and said maintaining means.

3. The data driven information processing system according to claim 2, wherein said cache memory means includes:
   a cache memory, and
   cache memory access means having input/output means connected to said first input/output of said maintaining means, responsive to the access instruction applied from said maintaining means for accessing an address of said cache memory based upon said access instruction for inputting/outputting data between said maintaining means and said cache memory.

4. The data driven information processing system according to claim 3, wherein said input/output means includes:
   write means responsive to a write instruction applied from said maintaining means for writing data included in the write instruction to an address designated by said write instruction of said main memory, and read means responsive to a read instruction applied from said maintaining means for reading data from an address designated by said read instruction of said main memory for applying the data to said maintaining means and said data driven processor.

5. The data driven information processing system according to claim 4, wherein said maintaining means includes:

instruction determining means operative in response to an access instruction applied from said data driven processor for determining whether an access instruction applied from said data driven processor is a write instruction or a read instruction, and for providing a determination result signal;

means responsive to the determination result signal applied from said address translation means, a determination result signal applied from said instruction determining means, and to a data packet from said data driven processor, for selectively executing writing to said main memory and to said cache memory, reading from said cache memory, or reading from said main memory and writing of the read data to said cache memory; and means for associating and storing, when writing to said cache memory by said selective executing means takes place, an address in said main memory of the data written to said cache memory and an address of said data in said cache memory, in said table.

6. The data driven information processing system according to claim 5, said maintaining means further includes:

means for storing information specifying an access mode of most recent access to every predetermined unit area of said cache memory, the access mode of the most recent access indicating whether the most recent access to the unit area was a read or a write, and means for comparing, when an access request to a unit area of said cache memory is generated, the access mode of the most recent access to said unit area and mode of the access to be taken by the access request, and for permitting or inhibiting access based on said access request dependent on the result of comparison.

7. The data driven information processing system according to claim 6, wherein said permitting or inhibiting means includes means for permitting an access based on said access request when the access mode of the most recent access of said unit area and the mode of the access to be taken differ from each other and for inhibiting said access when they are identical.

8. The data driven information processing system according to claim 4, further comprising:

a plurality of said main memories to which different addresses are allotted; wherein said maintaining means includes instruction determining means operative in response to an access instruction applied from said data driven processor for determining whether an access instruction applied from said data driven processor is a write instruction or a read instruction and for providing a determination result signal, means responsive to the determination result signal applied from said instruction determining means and to a data packet from said data driven processor for selectively executing writing to said main memory and to said cache memory, reading from said cache memory, or reading from said main memory and writing of the read data to said cache memory, in accordance with an address designation by the data packet, and address converting means responsive to generation of an access request to said cache memory by said selective executing means for converting an address designated by the data packet such that areas of different ones of said plurality of main memories are commonly assigned to one same area of said cache memory for executing access to said cache memory.

9. The data driven information processing system according to claim 8, wherein said address converting means includes masking means for ANDing a part of an address designated by the data packet with a prescribed bit pattern and replacing the part with a result of the ANDing.

10. The data driven information processing system according to claim 9, wherein said maintaining means further includes:

means for storing information specifying an access mode of a most recent access to every predetermined unit area of said cache memory, the access mode indicating whether the most recent access to the unit area was a read or a write, and means for comparing, when an access request to a unit area of said cache memory is generated, the access mode of the most recent access to the unit area and mode of the access to be taken by the access request, and for permitting or inhibiting access based on the access request dependent on the result of comparison.

11. The data driven information processing system according to claim 8, wherein said address converting means includes means for masking a part of an address designated by the data packet so as to produce a masked address, the masked address being used to access an address in said cache memory.

12. The data driven information processing system according to claim 8, wherein at least one of said main memories having an area commonly assigned to the one area of said cache memory is a read-only memory.

13. A method of operating a data driven information processing system which includes a data driven processor, a main memory for storing data to be processed by said driven processor, cache memory means provided between said data driven processor and said main memory and accessible at higher speed than said main memory, and maintaining means operatively connected to said data driven processor, to said cache memory means and to said main memory, and responsive to receipt of an access instruction for accessing said cache memory means or said main memory for inputting/outputting data between said data driven processor and said main memory or said cache memory means, and for maintaining said cache memory means such that contents of said cache memory are coherent with contents of said main memory, said method comprising the steps of:

(a) successively applying a series of data items necessary for executing a prescribed processing to said maintaining means for storage in said cache memory means and said main memory in write addresses designated by a predetermined order of said main memory;

(b) requesting said maintaining means to read, after a predetermined first number of said data items have been stored in said main memory, a second number of data items not exceeding said first number from read addresses designated by said predetermined order of said main memory, the maintaining means reading the second number of data items from said cache memory means;

(c) requesting said maintaining means, after executing a predetermined operation on the read data items, to write a result of the operation to a predetermined one of the read addresses from which the data items have been read in step (b), said maintaining means writing the result into said cache memory means;

(d) requesting said maintaining means to write a next data item of said series of data items to a next write address designated by said predetermined order of said main memory;

(e) requesting said maintaining means to read said second number of data items starting from a next read address designated by said predetermined order of said main memory, said maintaining means reading said second number of data items from said cache memory means; and (f) repeatedly executing said steps (c) and (d) and (e) in parallel to each other.

14. The method according to claim 13, wherein said second number equals said first number.

15. The method according to claim 14, wherein said predetermined order is an ascending order.

16. The method according to claim 15, wherein said first number is 2, and said step (c) includes a step of requesting said maintaining means to execute a predetermined operation on two read data items and to rewrite the result of operation to a smaller one of the read addresses of said main memory.

17. The method according to claim 14, wherein said first number is 2, and said step (c) includes requesting said maintaining means to rewrite the result to a smaller one of the read addresses of said main memory.

* * * * *